United States Patent
Lopez et al.

(10) Patent No.: US 11,968,067 B2
(45) Date of Patent: Apr. 23, 2024

(54) METHODS AND APPARATUS FOR SIGNALLING IN A WIRELESS LOCAL AREA NETWORK

(71) Applicant: Telefonaktiebolaget LM Ericsson (publ), Stockholm (SE)

(72) Inventors: Miguel Lopez, Solna (SE); Leif Wilhelmsson, Lund (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 308 days.

(21) Appl. No.: 17/625,156

(22) PCT Filed: Jul. 10, 2020

(86) PCT No.: PCT/EP2020/069650
§ 371 (c)(1),
(2) Date: Jan. 6, 2022

(87) PCT Pub. No.: WO2021/005236
PCT Pub. Date: Jan. 14, 2021

(65) Prior Publication Data
US 2022/0271985 A1    Aug. 25, 2022

Related U.S. Application Data

(60) Provisional application No. 62/872,957, filed on Jul. 11, 2019.

(51) Int. Cl.
*H04L 27/26* (2006.01)
*H04L 5/00* (2006.01)
(Continued)

(52) U.S. Cl.
CPC .......... *H04L 27/2613* (2013.01); *H04L 5/001* (2013.01); *H04L 27/26025* (2021.01);
(Continued)

(58) Field of Classification Search
CPC .......... H04L 27/26025; H04L 27/2613; H04L 27/2675; H04L 5/001; H04L 27/26132;
(Continued)

(56) References Cited

U.S. PATENT DOCUMENTS

2016/0007325 A1* 1/2016 Seok .................. H04L 27/2603
370/329

OTHER PUBLICATIONS

International Search Report and Written Opinion dated Oct. 15, 2020 for International Application No. PCT/EP2020/069650 filed Jul. 10, 2020, consisting of 8 pages.
(Continued)

*Primary Examiner* — Melvin C Marcelo
*Assistant Examiner* — Natali Pascual Peguero
(74) *Attorney, Agent, or Firm* — Weisberg I.P. Law, P.A.

(57) ABSTRACT

A method of signalling in a Wireless Local Area Network, WLAN, includes transmitting a signal having a physical layer data unit via a wireless channel of the WLAN using plural subcarriers spaced across plural symbols, the physical layer data unit having a data packet and a preamble, wherein the preamble has a synchronisation part having a channel estimation part. The channel estimation part has N training symbols, where N is an integer greater than 1, the N training symbols have synchronisation information for synchronising a second wireless device with the first wireless device, the synchronisation information having an offset value, and synchronisation information transmitted in second and subsequent training symbols is transmitted using offset subcarriers, the offset subcarriers being frequency offset with respect to reference subcarriers used to transmit synchronisation information in a first training symbol, the frequency offset being equal to the offset value.

17 Claims, 10 Drawing Sheets

(51) Int. Cl.
  *H04W 56/00* (2009.01)
  *H04W 84/12* (2009.01)
(52) U.S. Cl.
  CPC ....... *H04L 27/2675* (2013.01); *H04W 56/001* (2013.01); *H04L 27/26132* (2021.01); *H04L 27/26134* (2021.01); *H04W 84/12* (2013.01)
(58) Field of Classification Search
  CPC .......... H04L 27/26134; H04W 56/001; H04W 84/12
  See application file for complete search history.

(56) References Cited

OTHER PUBLICATIONS

Nabetani et al., "A Novel Low-Overhead Channel Sounding Protocol for Downlink Multi-User MIMO in IEEE 802.11ax WLAN", IEICE Trans. Commun., vol. E101-B, No. 3, pp. 924-932, Mar. 2018, consisting of 9 pages.

Madhavan et al. "Reducing Channel Sounding Protocol Overhead for 11ax", IEEE 802.11-15/1097r0, Sep. 2015, consisting of 16 pages.

Hart et al. "6 GHz Principles", IEEE 802.11-18/1897r0, Nov. 2018, consisting of 13 pages.

Hart et al. "Recommended Direction for EHT", IEEE 802.11-18/1549r0, Sep. 2018, consisting of 19 pages.

\* cited by examiner

1x-HE-LTF  $\quad \Delta f = 312.5\ kHz,\ T = 3.2\ us$ $$s_1(t) = \sum_k LTF_k \exp(j2\pi \cdot k \cdot \Delta f \cdot t), \quad 0 \leq t \leq T$$

FIG. 3

$\frac{\Delta f}{2}$-1x-HE-LTF  $\quad \Delta f = 312.5\ kHz,\ T = 3.2\ us,\ \alpha = \pm 1$ $$s_2(t) = \sum_k LTF_k \exp\left(j2\pi \cdot \left(k \cdot \Delta f + \alpha \frac{\Delta f}{2}\right) \cdot t\right) = \exp\left(j2\pi \cdot \alpha \frac{\Delta f}{2} \cdot t\right) s_1(t),\ 0 \leq t \leq T$$

FIG. 4

METHODS AND APPARATUS FOR SIGNALLING IN A WIRELESS LOCAL AREA NETWORK

CROSS-REFERENCE TO RELATED APPLICATIONS

This application is a Submission Under 35 U.S.C. § 371 for U.S. National Stage Patent Application of International Application No.: PCT/EP2020/069650, filed Jul. 10, 2020 entitled "METHODS AND APPARATUS FOR SIGNALLING IN A WIRELESS LOCAL AREA NETWORK," which claims priority to U.S. Provisional Application No. 62/872,957, filed Jul. 11, 2019, entitled "METHODS AND APPARATUS FOR SIGNALLING IN A WIRELESS LOCAL AREA NETWORK," the entireties of both of which are incorporated herein by reference.

TECHNICAL FIELD

Embodiments of the present disclosure relate to methods and apparatus for signalling in a Wireless Local Area Network (WLAN), and in particular methods and apparatus for transmitting a physical layer data unit via a wireless channel of the WLAN.

BACKGROUND

WLANs may be designed using IEEE 802.11 protocols operating at the 5 GHz frequency band. Typically, WLANs using the IEEE 802.11n/ac/ax protocols operating in the 5 GHz frequency band transmit control, management and short data frames (e.g. an acknowledgement (ACK) signal) using a Physical Layer Convergence Protocol Data Unit (PPDU) format that is compatible with the IEEE 802.11a protocol. The PPDU is designed to be compatible with the legacy IEEE 802.11a protocol in order that the WLAN is backward compatible with legacy devices (e.g. devices that are compatible with the IEEE 802.11a protocol but are not compatible with the IEEE 802.11n/ac/ax protocol).

In the future, the 6 GHz frequency band may be available for WLANs under unlicensed operation. The IEEE 802.11ax protocol is one variant of WLAN specifically designed to operate in the 6 GHz frequency band. In order to develop WLAN operation in the 6 GHz frequency band, a task group has been formed by the Institute of Electrical and Electronics Engineers (IEEE) Standards Association to create an IEEE 802.11be protocol. The IEEE 802.11be protocol task group (TGbe) aims to advance the IEEE 802.11ax protocol by developing Extremely High Throughput (EHT) WLANs. One of the objectives of the IEEE 802.11be protocol is to standardise a physical layer (PHY) for operation in the 6 GHz frequency band. The intention is that the IEEE 802.11be protocol will eventually supersede the IEEE 802.11ax protocol.

"6 GHz Principles" by "IEEE", November 2018, available at https://mentor.ieee.org/802.11/dcn/18/11-18-1897-00-00ax-6 ghz-principles.pptx as of 25 Jun. 2019, and "Recommended Direction for EHT" by "IEEE", September 2018, available at https://mentor.ieee.org/802.11/dcn/18/11-18-1549-00-0eht-candidate-technology-review.pptx as of 25 Jun. 2019 specify that no legacy devices are intended to operate in the 6 GHz frequency band, and therefore the use of inefficient or inadequate PHYs associated with legacy devices (i.e. devices which are only configured to operate in the 5 GHz frequency band) should be avoided in the 6 GHz frequency band. The above cited documents also indicate that WLAN wireless stations (STA) supporting IEEE 802.11be and 802.1ax will co-exist in the 6 GHz frequency band. In view of these considerations, the above cited documents propose a "Low Throughput" (LT) PPDU intended for operation in the 6 GHz frequency band that is well suited to EHT operation. The LT PPDU is designed to be analogous to the PPDU format used in the 5 GHz frequency band, but to be compatible with IEEE 802.11ax and IEEE 802.11be protocols operating in the 6 GHz frequency band. The LT PPDU may be suitable for use in transmitting control, management and short data frames.

FIG. 1 illustrates the prior art LT PPDU configured for operation at different bandwidths. The top LT PPDU of FIG. 1 is configured to operate at 20 MHz bandwidth and the bottom LT PPDU of FIG. 1 is configured to operate at 40 MHz bandwidth. The modulation technique used for transmitting the LT PPDU of FIG. 1 is, for example, Orthogonal Frequency-Division Multiplexing (OFDM), in which a plurality of subcarrier frequencies are transmitted during a plurality of symbols.

The 20 MHz LT PPDU of FIG. 1 comprises four parts each of which comprises two fields. Each of the four parts is transmitted during a separate 8 μs symbol, for example, 4 consecutive symbols. The first, second and third parts 102, 104, 106 together form the preamble of the LT PPDU. The first part 102 of the 20 MHz LT PPDU comprises two Legacy Short Training Fields (LSTFs) and the second part 104 of the 20 MHz LT PPDU comprises two Legacy Long Training Fields (LLTFs). The LSTFs and the LLTFs are configured to perform synchronisation between a wireless node and a wireless station of the WLAN. The third part 106 of the 20 MHz LT PPDU comprises two Low Throughput Signal (LTSIG) fields configured to transmit protocol information from a wireless node to a wireless station. The LTSIG fields of the 20 MHz LT PPDU transmit 40 bits of information using the Binary Phase Shift Keying (BPSK) MCS using a bit rate of ½. The fourth part 108 of the 20 MHz LT PPDU comprises two data fields comprising payload data to be transmitted to a wireless station. The payload data includes 208 data bits modulated according to the 16 Quadrature Amplitude Modulation (16QAM) scheme using a bit rate of ½.

The 40 MHz LT PPDU of FIG. 1 comprises the same four parts of the 20 MHz LT PPDU of FIG. 1. The 40 MHz LT PPDU differs from the 20 MHz LT PPDU in that the data fields transmit 432 data bits across 40 MHz, instead of 208 data bits across 20 MHz. The 40 MHz LT PPDU further differs from the 20 MHz LT PPDU in that the 20 MHz LSTFs and LLTFs are repeated in order to synchronise a wireless node with a wireless station across the entire 40 MHz bandwidth. The LTSIG also differs in the 40 MHz configuration in that a single LTSIG is repeatedly transmitted across a 4 μs symbol across 40 MHz, instead of two LTSIGs being transmitted during an 8 μs symbol across 20 MHz. In 40 MHz operation, the LTSIG is repeated in order to provide protocol information to a wireless station across the entire 40 MHz bandwidth.

Notable characteristics of the LT PPDUs illustrated in FIG. 1 include:
  Support for SISO mode only;
  The LTSIG utilises QBPSK. QBPSK is a binary phase shift keying modulation in which the binary data is mapped onto the imaginary (Q) axis;
  312.5 kHz subcarrier spacing, so that the digital signal can be generated using a 64-point Inverse Fast Fourier Transform (IFFT) in a 20 MHz channel or a 128 point IFFT in a 40 MHz channel.

The preamble is repeated (duplicated) when the LT PPDU bandwidth exceeds a bandwidth of 20 MHz. The data may or may not be repeated, depending on the type of modulation frame.

The use of QBPSK in the LTSIG can be used by IEEE 802.11be wireless stations to detect the format of the PPDU received from a wireless node. If the rotation is detected, the received PPDU is identified as an LT PPDU, whereas if the rotation is not detected the received PPDU is identified as a non-LT PPDU. IEEE 802.11ax wireless stations are unaware of the LT PPDU format and they will expect a legacy SIG (LSIG) which utilises BPSK followed by a repeated LSIG (RLSIG), which also utilises BPSK, instead of an LTSIG that utilises QBPSK. Therefore, IEEE 802.11ax wireless stations will fail to decode the LTSIG of the LT PPDU.

The LT PPDU provides a more efficient means of transmitting control, management and short data frames in the 6 GHz frequency band than alternatives such as those used in IEEE 802.11a/ax WLANs. However, the LT PPDU is based on PHYs designed for the IEEE 802.11a/ac protocol which are not as spectrally efficient as PHYs designed for the IEEE 802.11ax protocol. Therefore, a low overhead PHY for WLANs operating in the 6 GHz frequency band which is more spectrally efficient is desirable for EHT.

Objects of the disclosure include providing a physical layer data unit with reduced overhead and improving the efficiency of physical layer data unit transmission.

SUMMARY

Embodiments of the disclosure aim to provide methods and data wireless device apparatuses that alleviate some or all of the problems identified.

An aspect of the disclosure provides a method of signalling in a Wireless Local Area Network, WLAN, the method comprising: transmitting, at a first wireless device of the WLAN, a signal comprising a physical layer data unit via a wireless channel of the WLAN using plural subcarriers spaced across plural symbols, the physical layer data unit comprising a data packet and a preamble, wherein the preamble comprises: a synchronisation part comprising a channel estimation part, wherein: the channel estimation part comprises N training symbols, where N is an integer greater than 1, the N training symbols comprise synchronisation information for synchronising a second wireless device with the first wireless device, the synchronisation information comprising an offset value, and synchronisation information transmitted in second and subsequent training symbols is transmitted using offset subcarriers, the offset subcarriers being frequency offset with respect to reference subcarriers used to transmit synchronisation information in a first training symbol, the frequency offset being equal to the offset value.

The physical layer data unit provides a means for signalling at least one bit of information in the N training symbols by using more efficient IEEE 802.11ax numerologies and MCS in the enhanced signal field. The bit of information is encoded into the N training symbols in the form of the frequency offset (i.e. the offset value). This bit of information can be used to signal to the wireless station which MCS should be used to decode the enhanced signal field. By providing a means for an adaptable MCS for the enhanced signal field, the first wireless device is able to multiplex the signal portion and the data portion of the enhanced signal field into a single symbol, which reduces transmission overhead. In contrast, in known 802.11 PHYs, the SIG field (or fields) utilise a known, fixed MCS, namely BPSK with a code rate of ½. Alternatively, the additional bit of information can be used to signal to the wireless station the bandwidth of the enhanced signal field.

The physical layer data unit also provides a means for using Low Density Parity Check codes with the enhanced signal field, which further improves transmission performance.

The physical layer may also be referred to as the low overhead PPDU.

The synchronisation part may comprise an STF and/or an LTF. For example, the synchronisation part may comprise any of a Legacy Short Training Field (LSTF), a High Throughput Short Training Field (HT-STF), a Very High Throughput Short Training Field (VHT-STF), a High Efficiency Short Training Field (HE-STF), a Legacy Long Training Field (LLTF), a High Throughput Long Training Field (HT-LTF), a Very High Throughput Long Training Field (VHT-LTF) and/or a High Efficiency Long Training Field (HE-LTF).

The offset value may be equal to a subcarrier spacing divided by an integer greater than one. For example, the offset value may be equal to the reference subcarrier spacing divided by the number of N training symbols.

Each N training symbol may comprise a synchronisation information block and each synchronisation information block may comprise the offset value.

The wireless channel may be a frequency band within a 6 GHz band on which the physical layer data unit is transmitted, e.g. 20 MHz channel bands with 5 MHz or 10 MHz separation.

The first wireless device may transmit the physical layer data unit by modulating plural subcarriers with data (e.g. synchronisation information, protocol information and/or payload data). The modulated subcarriers may be transmitted via the wireless channel during plural symbol periods. The number of subcarriers transmitted during a symbol period may be defined by the subcarrier spacing.

Synchronisation may refer to configuring a first wireless device with a second wireless device such that the physical layer data unit can be accurately received and decoded by the second wireless device.

The offset value may comprise a detection multiplier, the method further comprising: receiving, at the second wireless device of the WLAN, the signal comprising the physical layer data unit; and detecting, at the second wireless device of the WLAN, the physical layer data unit by determining if the detection multiplier is set to a detection value.

The offset value may be multiplied by the detection multiplier (e.g. 157 kHz x−1).

The detection multiplier allows the wireless station to perform auto-detection of the physical layer data unit upon receipt. Auto-detection allows the wireless station to distinguish between legacy PPDUs and the physical layer data unit according to embodiments of the present disclosure, and thereby apply the appropriate processing methodology.

The detecting may further comprise selecting, at the second wireless device of the WLAN, a first received signal segment comprising the first training symbol and a second received signal segment comprising the second training symbol; adjusting, at the second wireless device of the WLAN, the frequency of the second received signal segment to negate the frequency offset; correlating, at the second wireless device of the WLAN, the first received signal segment with the adjusted second signal segment; and determining, at the second wireless device of the WLAN, that the detection multiplier is set to the detection value if the first and second received signal segments correlate to a correlation detection value that is equal to or greater than a detection threshold.

Adjusting the frequency of the second received signal segment may alternatively be referred to as rotating the second received signal segment.

The frequency offset of the second received signal segment may be negated by shifting in frequency the second received signal segment by an adjustment value, the adjustment value being equal to the negative of the offset value Negating may refer to cancelling out or nullifying or neutralising the frequency offset added by the first wireless device.

Shifting may be referred to as adding or subtracting the adjustment value to the received signal segment The second wireless channel may estimate the wireless channel used to transmit the physical layer data unit by correlating a reference wireless channel signal to a signal generated from segments of the received signal, wherein the signal generated from segments of the received signal comprises the first received signal segment comprising the first training symbol and the second received signal segment comprising the second training symbol.

The wireless channel may be a Single-Input Single-Output (SISO) wireless channel or may be a Multiple-Input Multiple-Output (MIMO) wireless channel.

The reference wireless channel signal may be a pure tone comprising a sinusoidal wave of a certain frequency (e.g. 156.25 kHz or 312.5 kHz).

The frequency offset of the second and subsequent N training symbols provides a means for performing wireless channel estimation at an increased resolution in the frequency domain with respect to LTF designs based on the 1×HE-LTF or 2×HE-LTF having the same duration. Further, the wireless channel estimation method is designed for use with the physical layer data unit described above, and therefore wireless stations configured to perform wireless channel estimation according to an alternative method associated with legacy PPDUs would estimate a poor channel quality and abort processing. Hence, wireless devices which are not compatible with the physical layer data unit described above will not waste time attempting to process the physical layer data unit, which would reduce throughput of those devices.

The preamble may further comprise: an enhanced signal field comprising a signal portion and a data portion, the signal portion comprising decoding information for decoding payload data transmitted in the data packet, and the data portion comprising further payload data, wherein the decoding information of the signal portion and the further payload data of the data portion are transmitted via the wireless channel in the same symbol.

Payload data may refer to the data being transmitted from the first wireless device to the second wireless device, e.g. the data intended for reception at the second wireless device and/or useful information for the recipient.

The same symbol may refer to a single OFDM symbol or the same part of a single OFDM symbol.

The protocol information may comprise the decoding information.

The synchronisation information may be transmitted in the N training symbols using a first subcarrier set, from among the plural subcarriers, the first subcarrier set being spaced across a first symbol set, from among the plural symbols, according to a primary subcarrier spacing, and the decoding information and the further payload data transmitted in the enhanced signal field are transmitted using a second subcarrier set, from among the plural subcarriers, the second subcarrier set being spaced across the same symbol according to a secondary subcarrier spacing, the secondary subcarrier spacing being less than the primary subcarrier spacing.

A set may refer to 1 or more subcarriers and/or 1 or more symbol.

Spacing may refer to a range of frequencies between each subcarrier or empty frequencies between each subcarrier or unused frequencies between each subcarrier.

The reduced spacing may result in a larger OFDM symbol duration.

The detection multiplier may vary according to one of a plurality of predetermined patterns, wherein the method further comprises: decoding, at the second wireless device of the WLAN, the decoding information of the signal portion according to a modulation scheme associated with the one of the plurality of predetermined patterns defined by the detection multiplier.

A predetermined pattern may be a positive value or a negative value or a sequence of positive values or a sequence of negative values or a sequence of positive and negative values.

A further aspect of the disclosure provides a wireless device configured to perform signalling in a Wireless Local Area Network, WLAN, the wireless device comprising processing circuitry and a non-transitory machine-readable medium storing instructions, wherein the wireless device is configured to: transmit a signal comprising a physical layer data unit via a wireless channel of the WLAN using plural subcarriers spaced across plural symbols, the physical layer data unit comprising a data packet and a preamble, wherein the preamble comprises: a synchronisation part comprising a channel estimation part, wherein: the channel estimation part comprises N training symbols, where N is an integer greater than 1, the N training symbols comprise synchronisation information for synchronising a second wireless device with the first wireless device, the synchronisation information comprising an offset value, and: synchronisation information transmitted in the second and subsequent training symbols is transmitted using offset subcarriers, the offset subcarriers being frequency offset with respect to reference subcarriers used to transmit synchronisation information in a first synchronisation symbol, the frequency offset being equal to an offset value.

Further aspects provide apparatuses and computer-readable media comprising instructions for performing the methods set out above, which may provide equivalent benefits to those set out above.

BRIEF DESCRIPTION OF DRAWINGS

For a better understanding of the present disclosure, and to show how it may be put into effect, reference will now be made, by way of example only, to the accompanying drawings, in which:

FIG. 3 illustrates a mathematical description of a first training symbol of FIG. 2;

FIG. 4 illustrates a mathematical description of a second training symbol of FIG. 2;

DETAILED DESCRIPTION

The following sets forth specific details, such as particular embodiments for purposes of explanation and not limitation. It will be appreciated by one skilled in the art that other embodiments may be employed apart from these specific details. In some instances, detailed descriptions of well-known methods, nodes, interfaces, circuits, and devices are omitted so as not obscure the description with unnecessary detail. Those skilled in the art will appreciate that the functions described may be implemented in one or more nodes using hardware circuitry (e.g., analog and/or discrete logic gates interconnected to perform a specialized function, ASICs, PLAs, etc.) and/or using software programs and data in conjunction with one or more digital microprocessors or general purpose computers that are specially adapted to carry out the processing disclosed herein, based on the execution of such programs. Nodes that communicate using the air interface also have suitable radio communications circuitry. Moreover, the technology can additionally be considered to be embodied entirely within any form of computer-readable memory, such as solid-state memory, magnetic disk, or optical disk containing an appropriate set of computer instructions that would cause a processor to carry out the techniques described herein.

Hardware implementation may include or encompass, without limitation, digital signal processor (DSP) hardware, a reduced instruction set processor, hardware (e.g., digital or analog) circuitry including but not limited to application specific integrated circuit(s) (ASIC) and/or field programmable gate array(s) (FPGA(s)), and (where appropriate) state machines capable of performing such functions.

In terms of computer implementation, a computer is generally understood to comprise one or more processors, one or more processing modules or one or more controllers, and the terms computer, processor, processing module and controller may be employed interchangeably. When provided by a computer, processor, or controller, the functions may be provided by a single dedicated computer or processor or controller, by a single shared computer or processor or controller, or by a plurality of individual computers or processors or controllers, some of which may be shared or distributed. Moreover, the term "processor" or "controller" also refers to other hardware capable of performing such functions and/or executing software, such as the example hardware recited above.

Figure 2:
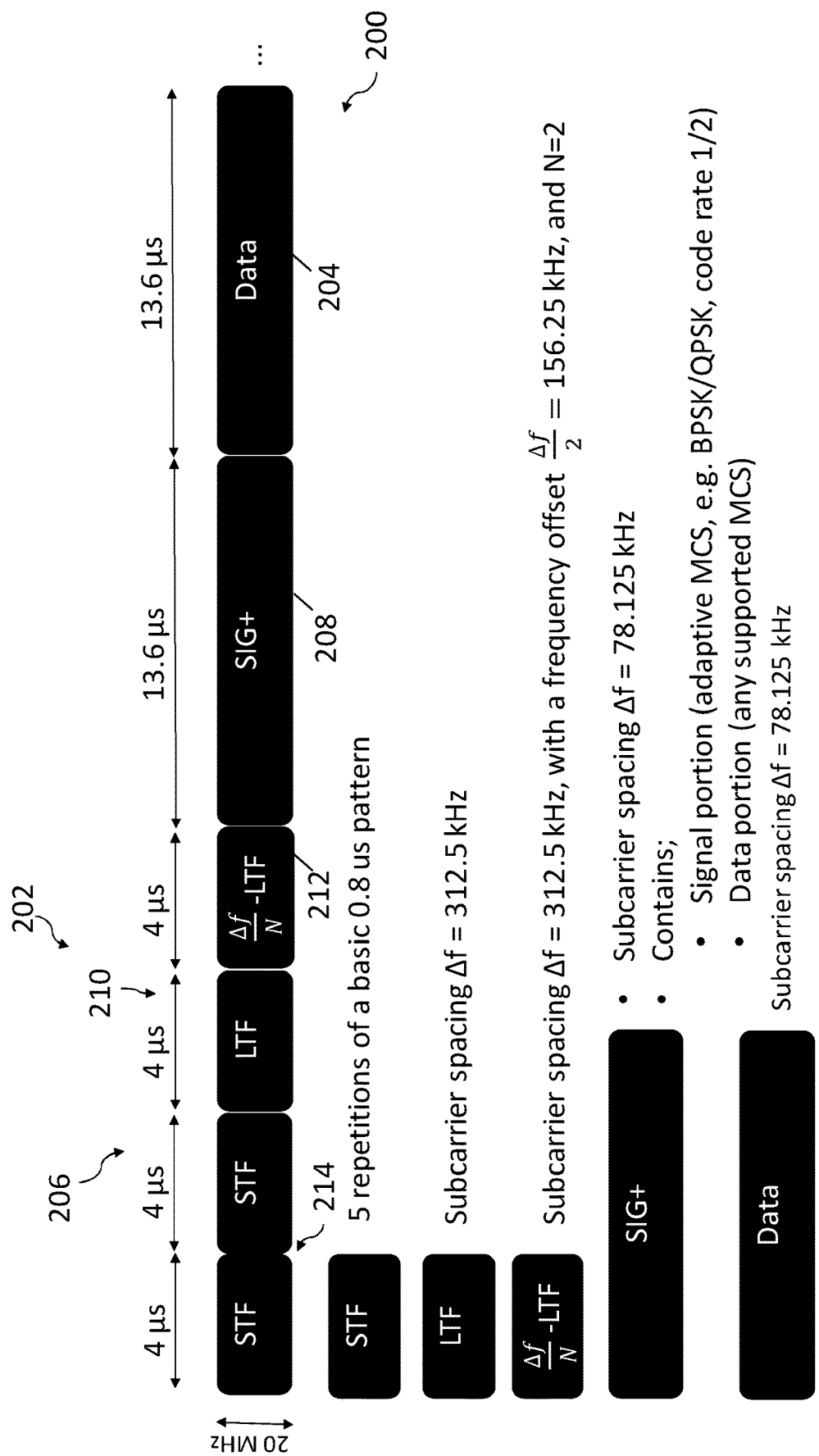
FIG. 2 is a conceptual diagram of a physical layer data unit in accordance with aspects of embodiments of the present disclosure.
Figure 11:
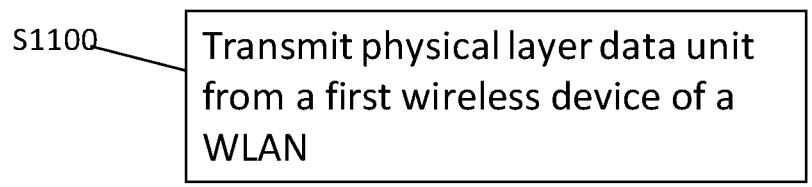
FIG. 11 shows a method performed by the first wireless device.
Figure 12:
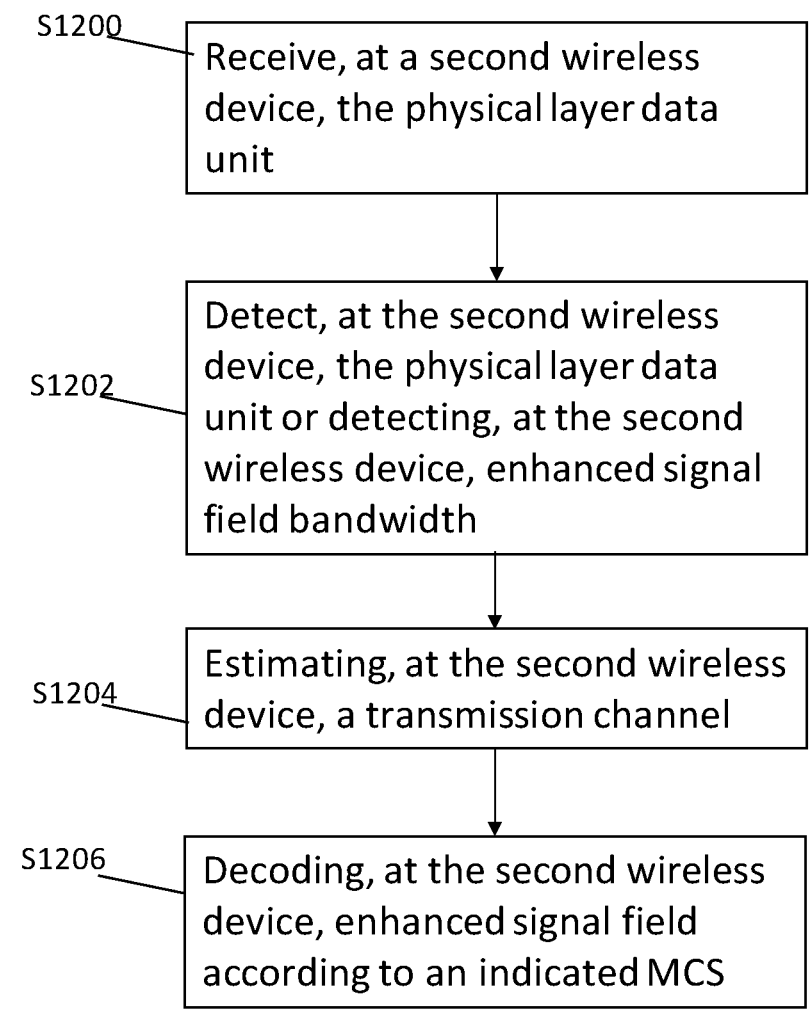
FIG. 12 shown a method performed by the second wireless device.

FIG. 2 is a conceptual diagram of a physical layer data unit 200 in accordance with aspects of embodiments of the present disclosure. Flowcharts of methods in accordance with aspects of embodiments of the present disclosure are shown in FIG. 11 and FIG. 12. The methods may be performed by any suitable apparatus, for example, the first and second wireless devices shown schematically in FIGS. 13, 14 and 15.

FIG. 11 shows the method performed by the first wireless device of a WLAN. The first wireless device transmits a signal comprising a low overhead physical layer data unit in the 6 GHz frequency band using plural subcarriers spaced across plural symbols. The physical layer data unit comprises a data packet and a preamble, wherein the preamble comprises a synchronisation part comprising a channel estimation part. The channel estimation part comprises N training symbols (where N is an integer greater than 1). The N training symbols comprise synchronisation information for synchronising the second wireless device with the first wireless device. The synchronisation information further comprises an offset value which itself comprises a detection multiplier (i.e. the detection multiplier is part of the offset value). The synchronisation information transmitted in the second and subsequent training symbols is transmitted using offset subcarriers, where the offset subcarriers are frequency offset with respect to reference subcarriers used to transmit synchronisation information in a first training symbol. The frequency offset is equal to the offset value.

The preamble of the physical layer data unit may further comprise an enhanced signal field comprising a signal portion and a data portion. The signal portion comprises decoding information for decoding payload data transmitted in the data packet, and the data portion comprises further payload data. The decoding information of the signal portion and the further payload data of the data portion are transmitted via the wireless channel in the same symbol by multiplexing the signal portion and the data portion together to generate the enhanced signal field. The enhanced signal field is able to transmit the data portion as well as the signal portion in the same symbol by reducing the spacing between the subcarriers used to transmit the signal portion and the further payload data. That is, the synchronisation information transmitted in the N training symbols is transmitted using a first subcarrier set, from among the plural subcarriers, the first subcarrier set being spaced across a first symbol set, from among the plural symbols, according to a primary subcarrier spacing. Whereas the decoding information and the further payload data transmitted in the enhanced signal field are transmitted using a second subcarrier set, from among the plural subcarriers, the second subcarrier set being spaced across the same symbol according to a secondary subcarrier spacing, where the secondary subcarrier spacing is less than the primary subcarrier spacing. Optionally, the payload data transmitted in the data packet is transmitted using a third subcarrier set, from among the plural subcarriers, the third subcarrier set being spaced across a second symbol set, from among the plural symbols, according to the secondary subcarrier spacing used for the enhanced signal field.

The preamble of the physical layer data unit may further comprise a short training symbol comprising further synchronisation information. The short training symbol may be, for example, a Short Training Field (STF).

Figure 13:
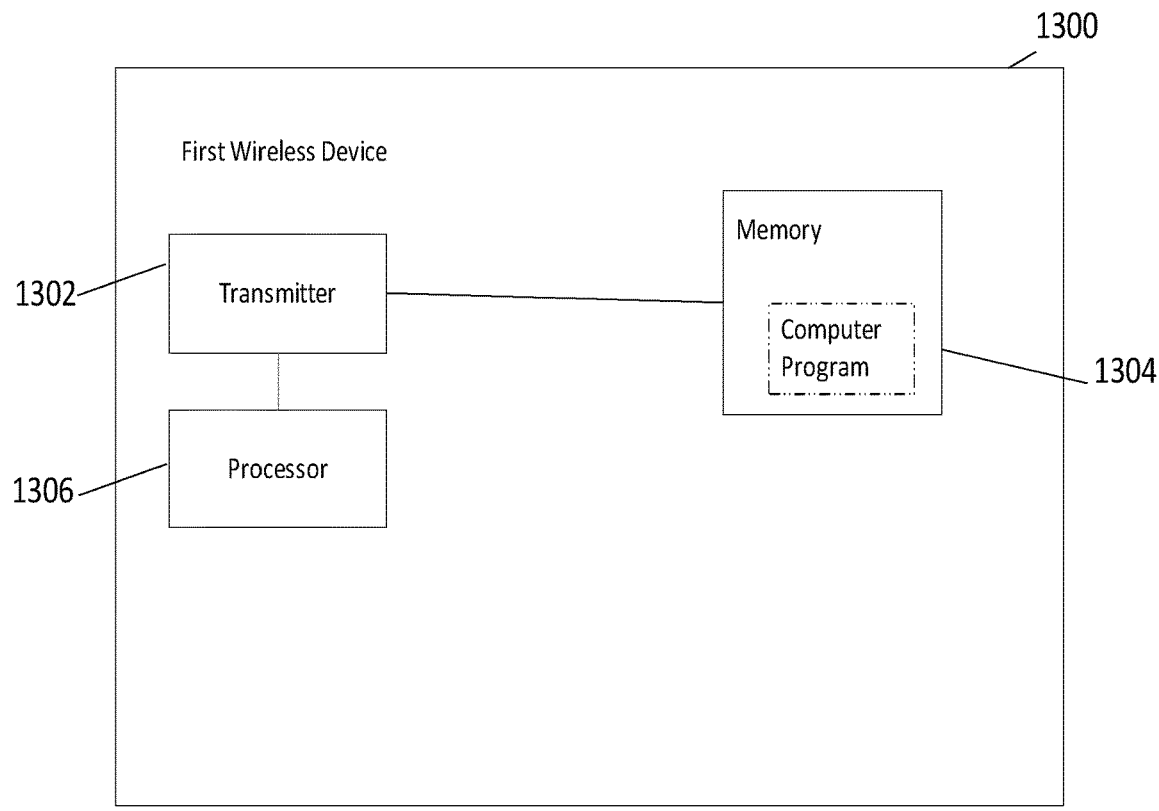
FIG. 13 is a schematic diagram of a first wireless device.
Figure 15:
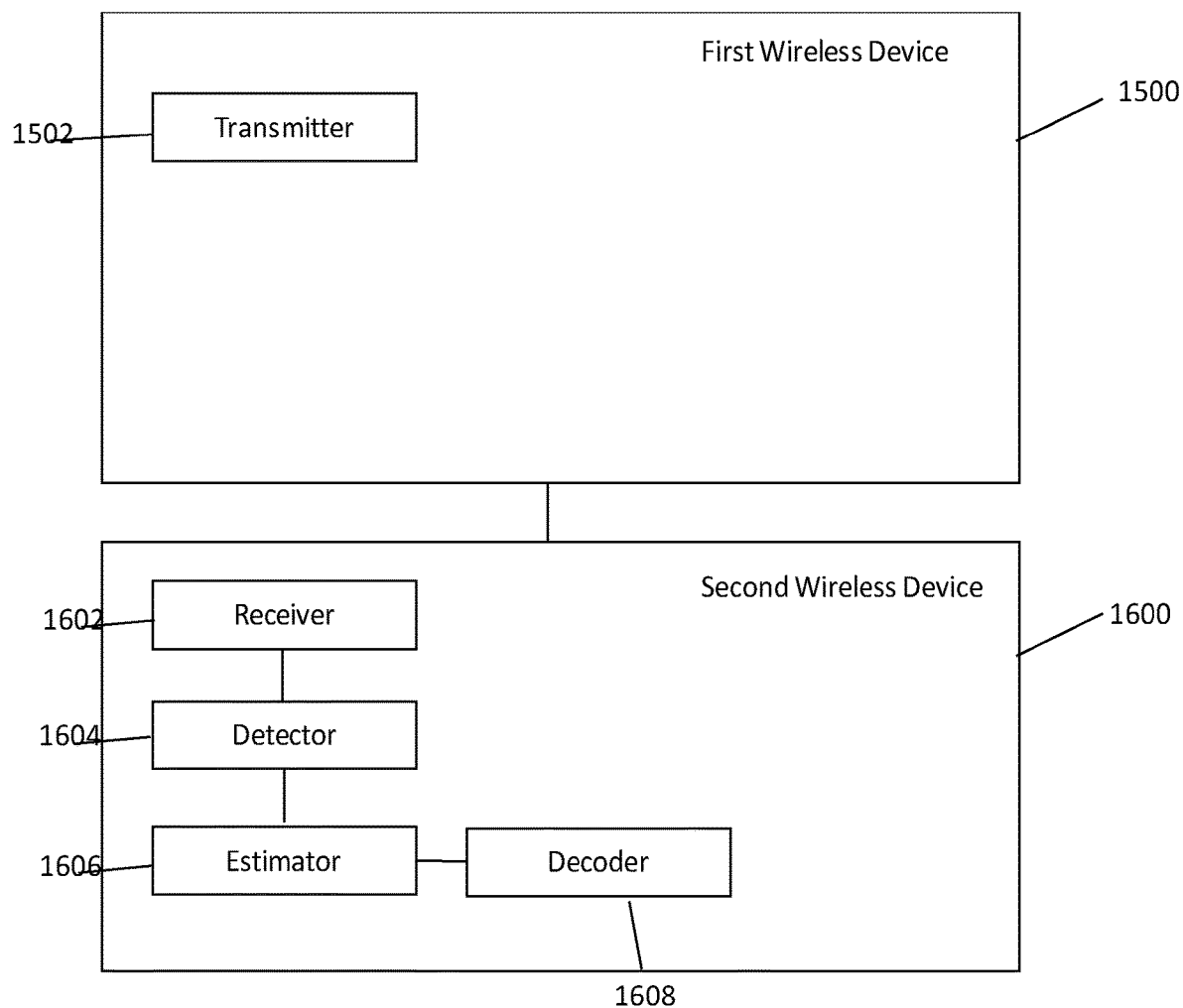
FIG. 15 is a schematic diagram of first and second wireless devices.

The transmitted physical layer may be transmitted by the transmitter 1302 of the first wireless device 1300 shown in FIG. 13 using a processor 1306 executing instructions stored in the memory 1304, or may be transmitted by the transmitter 1502 of the first wireless device 1500 shown in FIG. 15.

The physical layer data unit provides a means for signalling at least one bit of information in the N training symbols which enables the use of the more efficient IEEE 802.11ax numerologies and MCS in the enhanced signal field. The bit of information is encoded into the N training symbols in the form of the frequency offset (i.e. the offset value). This bit of information can be used to signal to the wireless station which MCS should be used to decode the enhanced signal field. By providing a means for an adaptable MCS for the enhanced signal field, the first wireless device is able to multiplex the signal portion and the data portion of the enhanced signal field into a single symbol, which reduces transmission overhead. In contrast, in known 802.11 PHYs, such as 802.11a PHYs, the SIG field (or fields) utilise a known, fixed MCS, namely BPSK with a code rate of ½. Alternatively, the additional bit of information can be used to signal to the wireless station the bandwidth of the enhanced signal field.

The physical layer data unit also provides a means for using Low Density Parity Check (LDPC) codes with the enhanced signal field, which further improves transmission performance. That is, LDPC typically improves transmission performance with respect to binary convolutional codes when the code word sizes are several hundreds of bits or longer. The enhanced signal field may comprise hundreds of bits, and therefore using LDPC with the enhanced signal field provides a means for improving transmission performance of the physical layer data unit.

FIG. 12 shown the method performed by the second wireless device of the WLAN. The second wireless device receives the physical later data unit from the first wireless device via the wireless channel. Upon receipt of the physical layer data unit, the second wireless device detects the presence of the physical layer data unit by determining if the detection multiplier is set to a detection value. The reception and detection may be performed by the receiver 1402 of the second wireless device 1400 shown in FIG. 14, executing instructions stored in the memory 1404, or may be performed by the receiver 1602 of the second wireless device 1600 shown in FIG. 15. The detection multiplier allows the wireless station to perform auto-detection of the physical layer data unit upon receipt. Auto-detection allows the wireless station to distinguish between legacy PPDUs and the physical layer data unit according to embodiments of the present disclosure, and thereby apply the appropriate processing methodology.

The second wireless device may select a first received signal segment comprising a first training symbol and a second signal segment comprising a second training symbol. The frequency of the second received signal segment is adjusted by the second wireless device to negate the frequency offset. In a particular embodiment, the frequency offset is negated by adjusting the frequency of the second received signal segment. The frequency is adjusted by imparting a frequency shift. The adjustment value is equal to the negative of the offset value. Correlation is performed between the first received signal segment and the adjusted second received signal segment. If the correlation exceeds a detection threshold, the second wireless device determines that the detection multiplier is set to the detection value and that the physical layer data unit has been detected.

The second wireless device may determine the bandwidth used to transmit the enhanced signal field based on the detection multiplier. That is, the second wireless device detects if the bandwidth of the enhanced data field is an upper bandwidth or a lower bandwidth based on the predetermined pattern of the detection multiplier. The predetermined pattern may be one of a plurality of predetermined patterns. Optionally, the second wireless device detects the upper bandwidth if the detection multiplier has a first value (e.g. 1, 0, −1), and the second wireless device detects the lower bandwidth if the detection multiplier has a second value (e.g. 1, 0, −1). The detection may be performed by the processor 1406 of the second wireless device shown in FIG. 14, executing instructions stored in the memory 1404, or may be performed by the detector 1604 of the second wireless device 1600 shown in FIG. 15.

The second wireless device may perform an estimation of the wireless channel used to transmit data between the first wireless device and the second wireless device by correlating reference wireless channel signals to a signal generated from segments of the received signal. The signal generated from segments of the received signal may comprise at least two training symbols from among the N training symbols. The reference wireless channel signals may, for example, be signals corresponding to subcarriers from the first subcarrier set, or subcarriers corresponding to the first subcarrier set which are shifted in frequency by a detected frequency offset (e.g. the second subcarrier set). Alternatively, the second wireless device may predict (e.g. hypothesise) a subcarrier having a frequency offset and correlate the predicted subcarrier with the training symbols.

The estimated wireless channel may be a Single-Input Single-Output (SISO) wireless channel or may be a Multiple-Input Multiple-Output (MIMO) wireless channel.

The second wireless device outputs the result of the correlation as a correlation estimate value. This outputted correlation estimate value indicates the channel estimate of the wireless channel used to transmit the physical layer data unit.

The correlation may be performed by a Fast Fourier Transform (FFT). The correlation estimate value may be one of a plurality of known constants. In embodiments, no further channel estimation processing occurs after the correlation estimate value is output, and there may be no need to validate the correlation estimate value. Further, the correlation estimate value may vary in magnitude (e.g. may be any value less than 1). Even if the correlation estimate value is very small, for example 0.1, the channel estimate may still be correct, because, due to fading, the channel amplitude can vary by several orders of magnitude, even in the absence of noise. The outputs of the channel estimation process may be sent to an equaliser; the success or failure of the process may be used to determine channel quality.

Alternatively, an artificial signal may be generated and correlated with a reference wireless channel signal to estimate the wireless channel. The artificial signal is generated by the second wireless device and comprises a first part comprising the first received signal segment (which comprises the first training symbol) added to the second received signal segment (which comprises the second training symbol), and a second part comprising the first received signal segment subtracted from the second received signal segment. The second wireless device outputs the result of the correlation as a correlation estimate value. This outputted correlation estimate value indicates the channel estimate of the wireless channel used to transmit the physical layer data unit.

Figure 14:
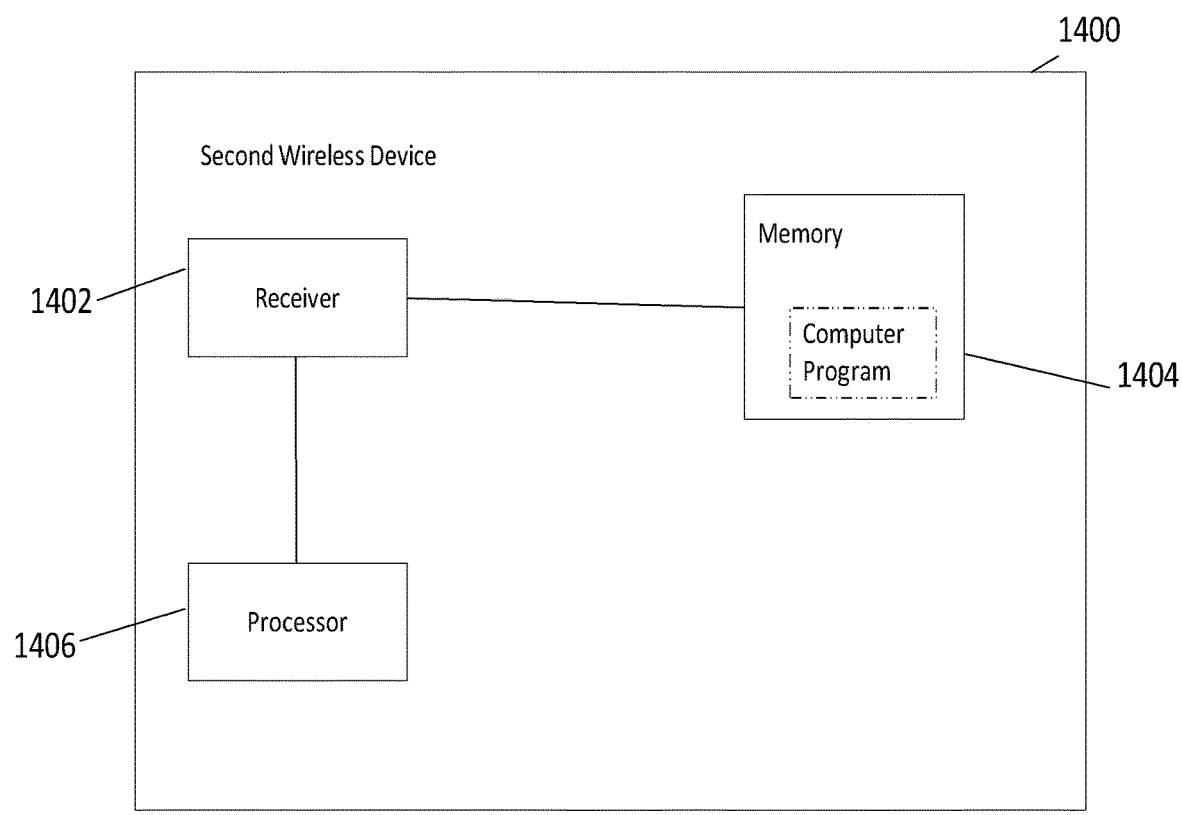
FIG. 14 is a schematic diagram of a second wireless device.

The estimation of a wireless channel may be performed by the processor 1406 of the second wireless device 1400 shown in FIG. 14, executing instructions stored in the memory 1404, or may be performed by the estimator 1606 of the second wireless device 1600 shown in FIG. 15.

The frequency offset of the N training symbols provides a means for performing wireless channel estimation at an increased resolution in the frequency domain with respect to LTF designs based on the 1×HE-LTF or 2×HE-LTF having the same duration. Further, the wireless channel estimation method is designed for use with the physical layer data unit described above, and therefore wireless stations configured to perform wireless channel estimation according to an alternative method associated with legacy PPDUs would estimate a poor channel quality and abort processing. Hence, wireless devices which are not compatible with the physical layer data unit described above will not waste time attempting to process the physical layer data unit, which would reduce throughput of those devices.

The second wireless device may perform demodulation of the information of the signal portion according to a modulation scheme associated with one of a plurality of predetermined patterns defined by the detection multiplier. In particular, a first demodulation scheme is used when the detection multiplier is positive, and a second demodulation scheme is used when the detection multiplier is negative. Alternatively, a first demodulation scheme is used when the detection multiplier varies between positive and negative values across the N reference symbols according to a first predetermined pattern, and a second demodulation scheme is used when the detection multiplier varies between positive and negative values across the N reference symbols according to a second predetermined pattern. The demodulation may be performed by the processor 1406 of the second wireless device 1400 shown in FIG. 14, executing instructions stored in the memory 1404, or may be performed by the decoder 1608 of the second wireless device 1600 shown in FIG. 15.

The first wireless device may be referred to as a wireless node of the WLAN and the second wireless device may be referred to as a wireless station of the WLAN. The terminology of wireless node and wireless station will be user hereinafter.

In the embodiment illustrated conceptually by FIG. 2, the physical layer data unit 200 of the present disclosure comprises a preamble 202 followed by a data packet 204 for operation in the 6 GHz frequency band. The physical layer data unit 200 is configured for transmission from a wireless node to a wireless station using a 20 MHz bandwidth channel of a WLAN. The modulation technique used to transmit the physical layer data unit 200 is Orthogonal Frequency Division Multiplexing (OFDM), in which a plurality of orthogonal subcarriers are modulated with information and transmitted across a WLAN during a plurality of symbols having varying durations.

The preamble 202 comprises a synchronisation part 206 and an enhanced signal field 208. The synchronisation part 206 performs synchronisation between a wireless node and a wireless station of the WLAN and the enhanced signal field 208 transmits protocol information (e.g. decoding information) from a wireless node to a wireless station. The synchronisation part 206 comprises a channel estimation part 210 which itself comprises N training symbols 212, where N is an integer greater than 1, and one or more Short Training Fields (STFs) 214 (two STFs are illustrated in the embodiment of FIG. 2). The physical layer data unit 200 illustrated in FIG. 2 differs from the PPDUs described above, with reference to FIG. 1, in that a frequency shift of $$\frac{\Delta f}{N}$$

is introduced to one of the symbols in the preamble 202. The physical layer data unit 200 is further distinguished from the PPDUs of FIG. 1 by the use of a first OFDM numerology for the synchronisation part 206, and a second OFDM numerology for the channel estimation part 210 and the data packet 204.

The channel estimation part 210 of the synchronisation part 206 has a variable duration due to the variable number of N training symbols 212. The N training symbols 212 may also be referred to as Long Training Fields (LTFs), as illustrated in FIG. 2. Each of the N training symbols 212 comprise synchronisation information and each N training symbols 212 is generated using the same subcarrier spacing of 312.5 kHz (denoted by $\Delta f$ in FIG. 2). A first training symbol of the N training symbols is a Long Training Field (LTF) and is transmitted using reference subcarriers. Second and subsequent training symbols are also LTFs and are transmitted using offset subcarriers, each of which is frequency offset by an offset value with respect to the frequency of the reference subcarriers. The offset value is calculated as the subcarrier spacing $\Delta f$ divided by the number of N training symbols 212 (denoted by $$\frac{\Delta f}{N}$$

in FIG. 3). The offset value is transmitted to the wireless station as part of the synchronisation information in each of the N training symbol. In the embodiment illustrated in FIG. 2, the subcarrier spacing is 312.5 KHz and the number of N training symbols 212 is N=2, which thereby generates an offset value of 156.25 kHz. The LTFs are configured to have an OFDM symbol duration of 3.2 μs and each LTF includes a cyclic prefix having a duration of 0.8 μs such that the total duration of a single N training symbol 212 is 4 μs. The N training symbols 212 may be Legacy Long Training Fields (LLTFs) or High Efficiency Long Training Fields (HE-LTFs), for example.

The two STFs 214 of the synchronisation part 206 comprise further synchronisation information transmitted as ten repeated time domain patterns, each of which has a duration of 0.8 μs. The total duration of the two STFs 214 is 8 μs (including a cyclic prefix of 0.8 μs for each of the two STFs 214). The STFs may be Legacy Short Training Fields (LSTFs) or High Efficiency Short Training Fields (HE-STFs), for example.

The channel estimation part 210 and the two STFs 214 are configured to enable synchronisation between a wireless node and a wireless station of the WLAN. For example, the two STFs 214 may enable Automatic Gain Control (AGC) convergence, coarse frequency acquisition and timing synchronisation. The channel estimation part 210 may, for example, enable channel estimation, enable fine frequency acquisition and enable fine timing acquisition.

The enhanced signal field 208 of the preamble 202 may also be referred to as SIG+, as illustrated in FIG. 2. The enhanced signal field 208 comprises a signal portion which contains protocol information including decoding information for decoding payload data transmitted in the data packet 204. The protocol information may, for example, be any of information related to Modulation and Coding Schemes (MCS), Guard Interval (GI) length and/or bandwidth. The MCS used for the enhanced signal field 208 is adaptable and can vary according to design requirements, as will be described in detail below.

The subcarrier spacing of the enhanced signal field 208 is less than the subcarrier spacing used to generate to N training symbols 212 and the STFs 214 of the synchronisation part 206. That is, the N training symbols 212 and the STFs 214 are transmitted using a first subcarrier set (i.e. the subcarriers used to transmit the N training symbols 212 and the STFs 214) from among the plural subcarriers, and the first subcarrier set is spaced across a first symbol set (i.e. the symbols used to transmit the N training symbols 212 and the STFs 214) from among the plural symbols according to a primary subcarrier spacing. The decoding information transmitted in the enhanced signal field 208 is transmitted using a second subcarrier set (i.e. the subcarriers used to transmit the enhanced signal field 208) from among the plural subcarriers, and the second subcarrier set is spaced across an enhanced signal field symbol according to a secondary subcarrier spacing which is less than the primary subcarrier spacing.

As a result of the reduced subcarrier spacing used to transmit the enhanced signal field 208, the symbol duration of the enhanced signal field symbol is increased. In the embodiment illustrated in FIG. 2, the subcarrier spacing is reduced to 78.125 KHz thereby resulting is the enhanced signal field symbol duration being increased to 13.6 µs (i.e. 12.8 µs plus a cyclic prefix of 0.8 µs).

The reduced subcarrier spacing results in an increased number of subcarriers being transmitted during the enhanced signal field symbol. The additional subcarriers may optionally be multiplexed with data in order to reduce overhead of the physical layer data unit 200. In a particular embodiment of the present disclosure, the enhanced signal field 208 further comprises a data portion which includes further payload data that is compatible with any MCS supported by the wireless channel (e.g. BPSK or QPSK). The further payload data is data that would otherwise have been transmitted in the data packet 204 if the enhanced signal field 208 was not used. The further payload data is multiplexed with the protocol information (e.g. decoding information) to generate the enhanced signal field 208 such that they are both transmitted in the enhanced signal field symbol (i.e. the same symbol).

The data packet 204 of the physical layer data unit 200 may have the same subcarrier spacing as that used for the enhanced signal field 208. That is, the payload data transmitted in the data packet 204 is transmitted using a third subcarrier set (i.e. the subcarriers used to transmit the data packet 204) from among the plural subcarriers, and the third subcarrier set is spaced across a second symbol set (i.e. the symbols used to transmit the data packet 204) from among the plural symbols according to the secondary subcarrier spacing used for the enhanced signal field 208. The reduced subcarrier spacing results in an increased number of subcarriers being transmitted during a data packet symbol, which has the same duration as the enhanced signal field symbol (i.e. 13.6 µs). The increased number of subcarriers in the data packet 204 providing a means for transmitting an increased volume of payload data per data symbol. The MCS used to decode the data symbol of the data packet 204 is indicated by the enhanced signal field 208. The physical layer data unit 200 may include a plurality of data packets 204 each transmitting payload data via data symbols as described above.

In another embodiment of the present disclosure, a general signal field having the same subcarrier spacing as the synchronisation part 206 is used instead of the enhanced signal field 208. That is, the physical layer data unit 200 may comprise one or more data packets 204 and a preamble 202, where the preamble comprises the synchronisation part 206 and the general signal field.

The manner in which a frequency offset is generated between the offset subcarriers of the first training symbol and the second and subsequent training symbols will now be discussed with reference to FIGS. 3 and 4. FIGS. 3 and 4 provide mathematical descriptions of the first training symbol and the second training symbol illustrated in FIG. 2, where N=2. The subsequent training symbols have mathematical descriptions corresponding to the second training symbol.

FIG. 3 illustrates a mathematical description $s_1(t)$ of the first training symbol of FIG. 2 (i.e. LTF) before the cyclic prefix is inserted. The first training symbol is an HE-LTF with a subcarrier spacing $\Delta f$ of 312.5 kHz and a symbol period T of 3.2 µs. The term $LTF_k$ denotes the frequency domain symbols comprised in the HE-LTF, and the exponential term (i.e. $\exp(j2\pi \cdot k \cdot \Delta f \cdot t)$) is the complex exponential function of the IFFT for the first training symbol.

FIG. 4 illustrates a mathematical description $s_2(t)$ of the second training symbol of FIG. 2

$$\left(\text{i.e. } \frac{\Delta f}{2} LTF\right)$$

before the cyclic prefix is inserted. The second training symbol is an HE-LTF with a subcarrier spacing $\Delta f$ of 312.5 kHz, each of which are offset by $$\frac{\Delta f}{2}$$

with respect to the first training symbol, and a symbol period T of 3.2 µs. The term $LTF_k$ denotes the frequency domain symbols comprised in the HE-LTF and the exponential term is the complex exponential function of the IFFT for the second training symbol. FIG. 4 illustrates the relationship between the first training symbol and the second training symbol, as follows:

$$s_2(t) = \exp\left(j2\pi \cdot \alpha \frac{\Delta f}{2} \cdot t\right) \cdot s_1(t),$$

where $s_1(t)$ denotes the first training symbol and $s_2(t)$ denotes the second training symbol.

The frequency offset of the second training symbol is illustrated by the following term in FIG. 4:

$$\alpha \frac{\Delta f}{2},$$

where $\alpha$ is a detection multiplier which denotes the sign of the frequency shift (e.g. $\alpha = \pm 1$) and $$\frac{\Delta f}{2}$$

denotes me onset value.

The detection multiplier is used by a wireless receiver of the WLAN to detect whether or not the received PPDU is the physical layer data unit 200. That is, the wireless station determines if the received PPDU is an IEEE 802.11ax PPDU or the physical layer data unit 200. Details of using the detection multiplier to detect the physical layer data unit 200 will be discussed in detail below.

The detection multiplier can be fixed (i.e. always 1) or it can be variable. If the detection multiplier is variable, then the wireless node uses it to signal one bit of information to the receiver. For example, the wireless node may use the detection multiplier to indicate which MCS to use for the enhanced signal part 208, or to indicate the channel bandwidth. In a case where the detection multiplier is used to indicate a particular MCS for use in decoding the enhanced signal part 208, a first modulation scheme (e.g. BPSK) is used when the detection multiplier is identified as being a positive value, and a second modulation scheme (e.g. Quadrature Phase Shift Keying (QPSK)) is used when the detection multiplier is identified as being a negative value. Alternatively, the first modulation scheme is used when the detection multiplier varies between positive and negative values across the N training symbols according to a first predetermined pattern, and the second modulation scheme is used when the detection multiplier varies between positive and negative values across the N training symbols according to a second predetermined pattern. The first and second predetermined patterns are, for example, series of detection multipliers corresponding to a series of N training symbols which alternate between positive and negative values according to predetermined patterns. For example, the first predetermined pattern is "+1, −1, +1, −1" and the second predetermined pattern is "+1, +1, −1, −1".

Figure 5:
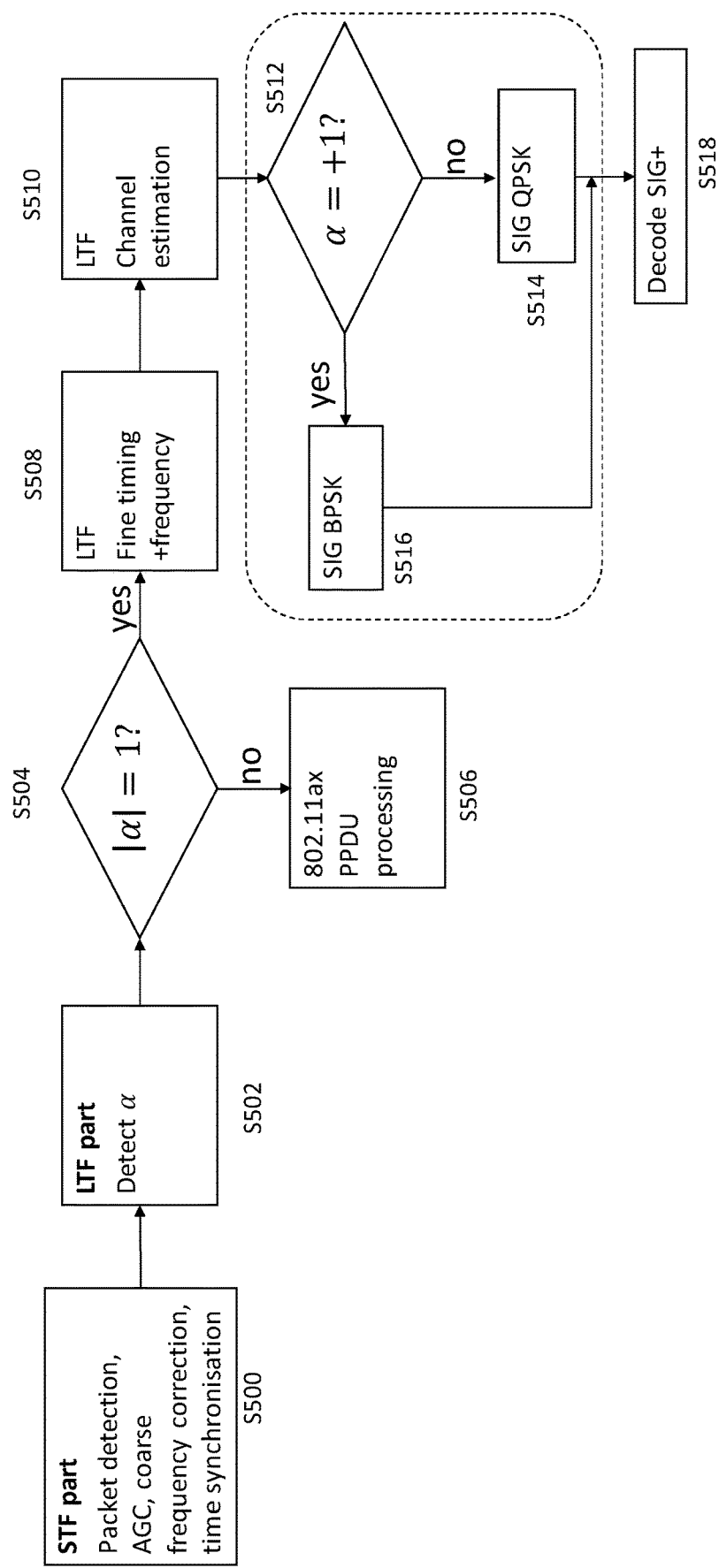
FIG. 5 is a flow diagram illustrating a receiving process performed by a wireless station.

FIG. 5 is a flow diagram illustrating the receiving process performed by a wireless station upon receipt of the physical layer data unit 200. In S500, the STFs are processed to detect the PPDU, perform ACG, perform coarse frequency acquisition and perform timing synchronisation. In S502, the channel estimation part 210 (i.e. the LTFs) is processed to identify the detection multiplier of the second training symbol (i.e. the second LTF of FIG. 2). In S504, the absolute value of the detection multiplier is determined. If the absolute value of the detection multiplier is not equal to 1 (i.e. "no" at S504), the wireless station determines that the received PPDU is not the physical layer data unit 200 and the process proceeds to S506. At S506, the received PPDU is processed according to the IEEE 802.11ax protocol. If the absolute value of the detection multiplier is equal to 1 (i.e. "yes" at S504), the wireless station determines that the received PPDU is the physical layer data unit 200 and the process proceeds to S508. At S508, the channel estimation part 210 is further processed to perform fine frequency acquisition and perform fine timing acquisition. Wireless channel estimation is performed at S510. S512 to S514 are optional steps which determine the sign of the detection multiplier. In a particular embodiment, the sign of the detection multiplier is used to identify to the wireless station which MCS should be used to decode the enhanced signal field 208. If the detection multiplier is determined to be positive (i.e. "yes" at S516), the wireless station selects BPSK as the MCS to be used to decode the enhanced signal field 208. If the detection multiplier is determined to be negative (i.e. "no" at S514), the wireless station selects QPSK as the MCS to be used to decode the enhanced signal field 208. After the sign of the detection multiplier had been determined, the process proceeds to S518 where the enhanced signal field 204 is decoded.

Figure 6:
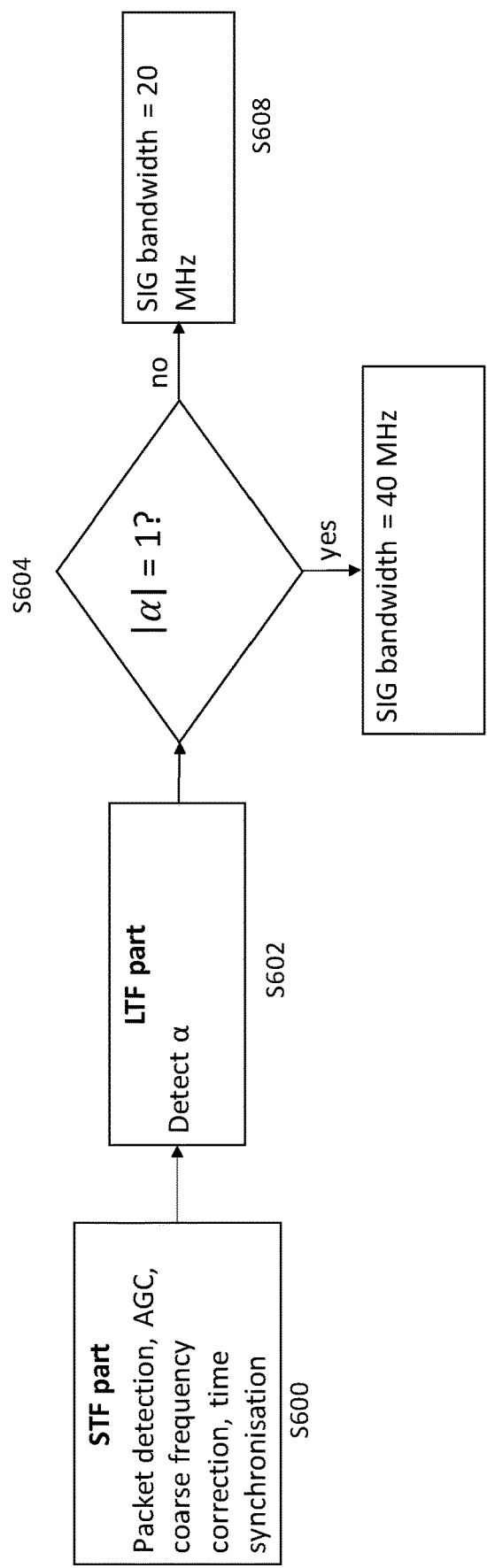
FIG. 6 is a flow diagram for determining the bandwidth of the enhanced signal field.

FIG. 6 is a flow diagram illustrating an embodiment in which the detection multiplier α is used to determine the bandwidth of the enhanced signal field 208, or to determine the bandwidth of the general signal field in the embodiment where the general signal field is used instead of the enhanced signal field 208. In certain embodiments, the detection multiplier is used to determine the bandwidth of the enhanced signal field 208 (or the bandwidth of the general signal field), detect whether or not the received PPDU is the physical layer data unit and/or determine which MCS to use for decoding the enhanced signal field 208.

S600 and S602 of FIG. 6 repeat the steps of S500 and S502 in FIG. 5, and therefore the description is omitted for these steps for conciseness. At S604, the absolute value of the detection multiplier is determined. If the absolute value of the detection multiplier is not equal to 1 (i.e. "no" at S604), the wireless station proceeds to S608 and determines that the enhanced signal field 208 (or the general signal field) has a bandwidth of 20 MHz. If the absolute value of the detection multiplier is equal to 1 (i.e. "yes" at S604), the wireless station proceeds to S606 and determines that the enhanced signal field 208 (or the general signal field) has a bandwidth of 40 MHz.

Figure 7:
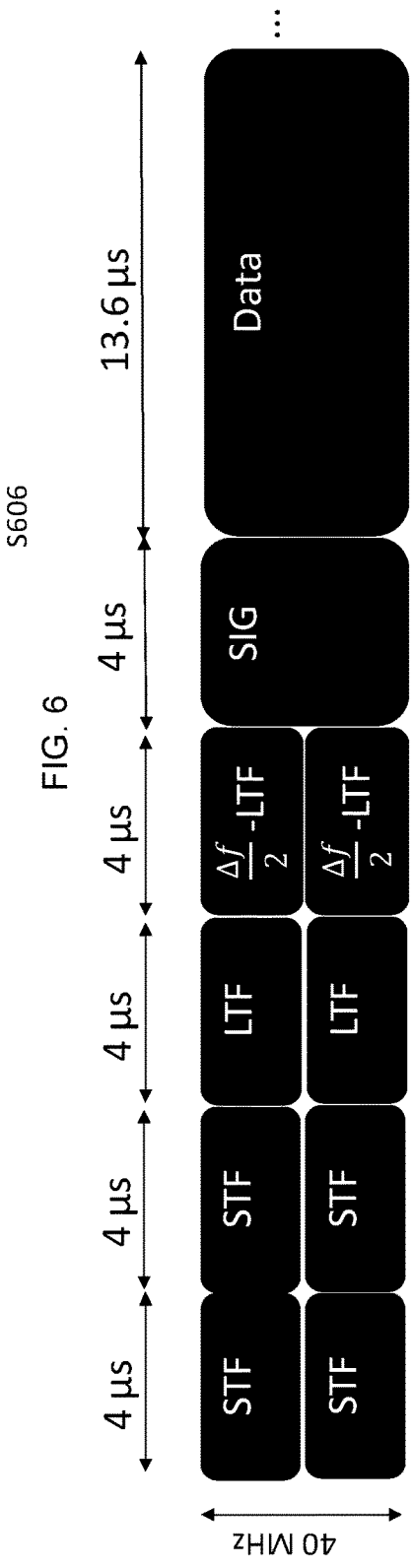
FIG. 7 illustrates an embodiment where a general signal field is transmitted using a 40 kHz bandwidth.

FIG. 7 illustrates an embodiment where the general signal field of the physical layer data unit 200 is transmitted using a 40 MHz bandwidth in accordance with the method described in relation to FIG. 6. As can be seen from FIG. 7, the general signal field and the data packet 204 are transmitted across the entire 40 MHz bandwidth, but the synchronisation part 206 is repeated in the frequency domain in order to synchronise the wireless node with the wireless station across the entire 40 MHz bandwidth. The symbols corresponding to the general signal field and the symbols corresponding to the data packet 204 have 40 MHz bandwidth.

A specific method of performing detection of the physical layer data unit 200 at a wireless station will now be discussed. Other methods of detecting the physical layer data unit 200 at the wireless station may be used.

The wireless station detects that the physical layer data unit 200 has been received by identifying that the detection multiplier is set to a detection value (e.g. 1). In order to determine whether the detection multiplier is set to the detection value, the wireless station selects a first received signal segment comprising a first training symbol and selects a second signal segment comprising a second training symbol. The first and second received signal segments are illustrated in equations (1) and (2) below:

$$r_1(t)=h*s_1(t)+w_1(t), 0 \leq t \leq T \quad (1)$$

$$r_2(t)=h*s_2(t-T)+w_2(t), T < t \leq 2T \quad (2)$$

where h is the wireless channel and functions $w_1$ and $w_2$ indicate system noise.

Before performing the correlation of the two signals, the frequency of the second received signal segment is adjusted to negate the frequency offset applied to the second and subsequent training symbols before transmission of the physical layer data unit 200 from the wireless node. The frequency of the second received signal segment is adjusted by an adjustment value which is equal to the negative of the offset value. That is, the adjustment value is equal to the negative value of the offset value. For example, if the offset value is +156.25 kHz the adjustment value is −156.25 kHz, or if the offset value is −156.25 kHz the adjustment value is +156.25 kHz.

Following adjustment of the second received signal segment, the correlation of the first and second received signal segments is performed to calculate a correlation detection value, as illustrated in equation (3):

$$D(\alpha) \equiv \left| \int_0^T r_1(t) \cdot r_2(t)^* \cdot \exp\left(j2\pi \cdot \alpha \frac{\Delta f}{2} \cdot t\right) dt \right| \quad (3)$$

where $D(\alpha)$ is the correlation detection value (also referred to as a detection statistic).

The physical layer data unit 200 is identified as being received at the wireless station if the correlation detection value is equal to or greater than a detection threshold, as illustrated in equation (4):

$$\max_{\alpha \in \{-1,1\}} D(\alpha) > \gamma \rightarrow \text{physical layer data unit is detected} \quad (4a)$$

$$\hat{\alpha} = \arg\max_{\alpha \in \{-1,1\}} D(\alpha) \quad (4b)$$

where γ in (4a) is the detection threshold and, in (4b), $\hat{\alpha}$ determines whether the detection multiplier is positive or negative.

If the correlation detection value is equal to or greater than the detection threshold, the wireless station determines that the detection multiplier is set to the detection value, and therefore that the received PPDU is the physical layer data unit 200.

A specific method of performing channel estimation at a wireless station will now be discussed. Other methods of performing channel estimation at the wireless station may be used.

The wireless station estimates the wireless channel by correlating received signal segments comprising training symbols with subcarriers having frequencies corresponding to the frequencies of the subcarriers onto which the signal field (e.g. the enhanced signal field) and data (e.g. the further payload data) have been modulated. These subcarriers (the reference wireless channel signals) may be pure tones with a frequency of k.

$$k \cdot \frac{\Delta f}{2},$$

where k is an integer.

The wireless station processes one or more received signal segments comprising training symbols to identify the frequency offset $$\frac{\Delta f}{2}$$

indicated by the offset value. After the frequency offset has been identified, the value of the frequencies of the subcarriers comprised in each of the N training symbols can be determined by the second wireless device. The wireless channel may be estimated by correlating segments of the received signal comprising the training symbols with one or more pure tones having these determined frequencies. The pure tones may, for example, be signals corresponding to subcarriers from the first subcarrier set, or subcarriers corresponding to subcarriers from the first subcarrier set which are shifted in frequency by a detected frequency offset (e.g. corresponding to subcarriers from the second subcarrier set).

In an embodiment of the disclosure, the wireless channel is estimated by generating an artificial signal and correlating the artificial signal with the reference wireless channel signals. The artificial signal is generated by the wireless station by generating a first part containing a first received signal segment comprising a first training symbol added to a second received signal segment comprising a second training symbol, and generating a second part containing the first received signal segment comprising the first training symbol subtracted from the second received signal segment comprising the second training symbol, as illustrated by equation (5):

$$y(t) \equiv \begin{cases} r_1(t) + r_2(t+T), & 0 \le t \le T \\ r_1(t-T) - r_2(t), & T < t \le 2T \end{cases} \quad (5)$$

where y(t) denotes the artificial signal.

The artificial signal is correlated with the reference wireless channel signals in order to generate a channel estimate based on a correlation estimate value. The correlation estimate value is proportional to the channel estimate, as shown in equation (6). Equation (6) is a mathematical illustration of how the artificial signal y(t) is correlated with a reference wireless channel signal:

$$\int_0^{2T} y(t) \cdot \exp\left(-j2\pi \cdot k \frac{\Delta f}{2} \cdot t\right) dt = 2T \cdot H_k \cdot LTF_{\lfloor k/2 \rfloor} \quad (6)$$

$$\rightarrow \text{Channel estimates } H_k \text{ spaced } \frac{\Delta f}{2} = 156.25 \text{ kHz}$$

where $\lfloor k/2 \rfloor$ denotes the floor function, the detection multiplier α=1 and $H_k$ denotes the desired channel estimate.

By performing wireless channel estimation according to any of the methods discussed above, the wireless channel can be estimated at a resolution of $$\frac{\Delta f}{2}$$

despite the subcarrier spacing of the N training symbols being Δf.

Figure 8:
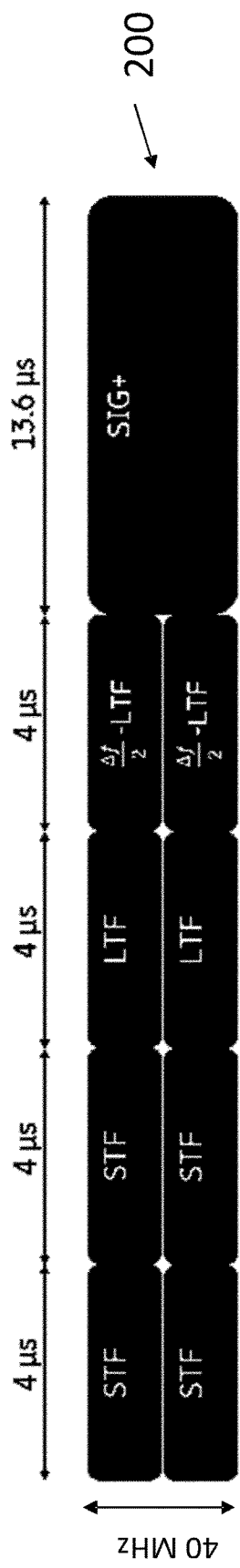
FIG. 8 illustrates an embodiment where an enhanced signal field is transmitted using a 40 kHz bandwidth.

FIG. 8 illustrates an embodiment where the enhanced signal field 208 of the physical layer data unit 200 is transmitted using a 40 MHz bandwidth. In the case of a 40 MHz bandwidth, the enhanced signal field 208 and the data 204 (not shown) are transmitted across the entire 40 MHz bandwidth, but the synchronisation part 206 is repeated in the frequency domain in order to synchronise the wireless node with the wireless station across the entire 40 MHz bandwidth. The enhanced signal field 208 and the symbols corresponding to the data 204 have 40 MHz bandwidth.

Figure 1:
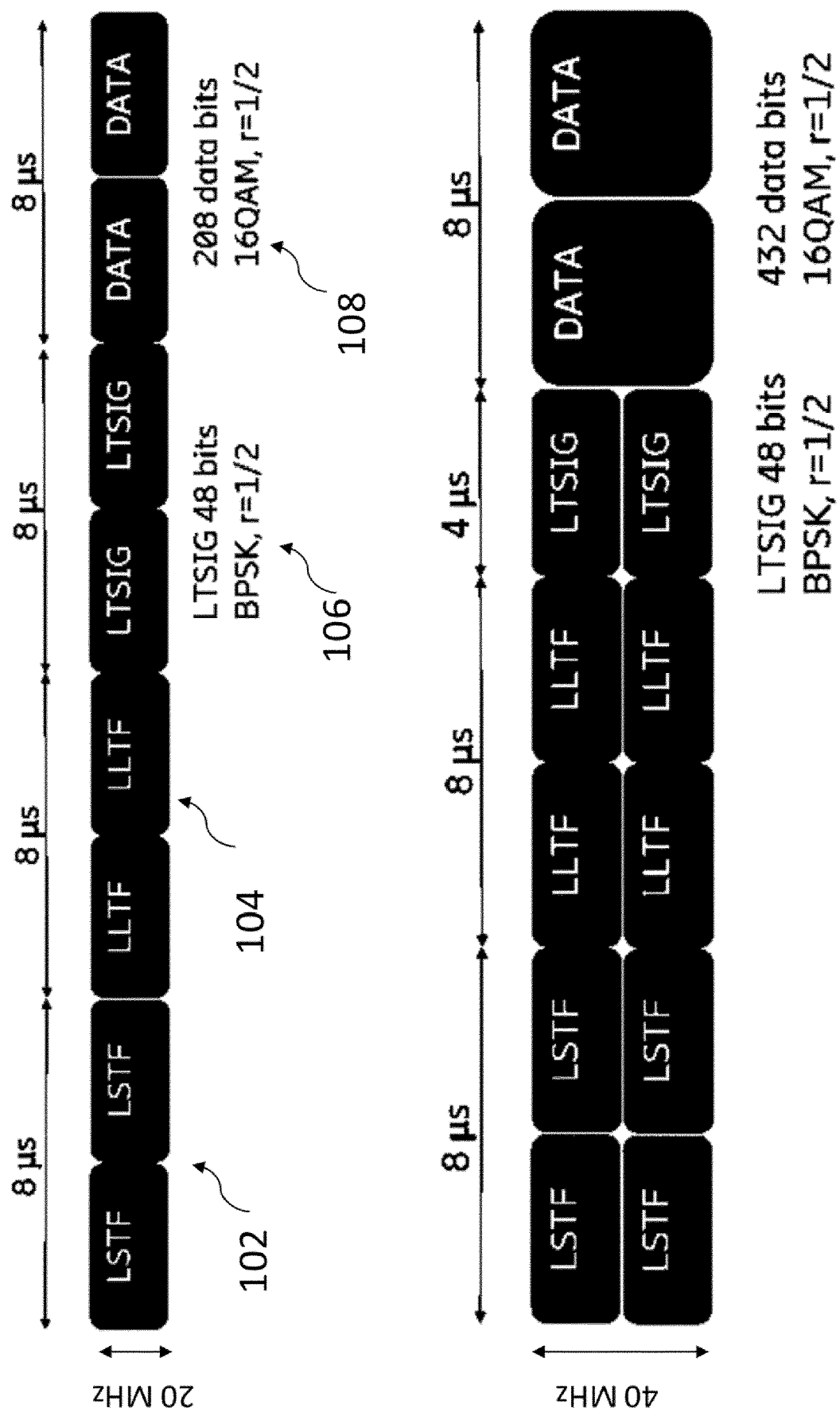
FIG. 1 illustrates a prior art LT PPDU configured for operation at different bandwidths.
Figure 9:
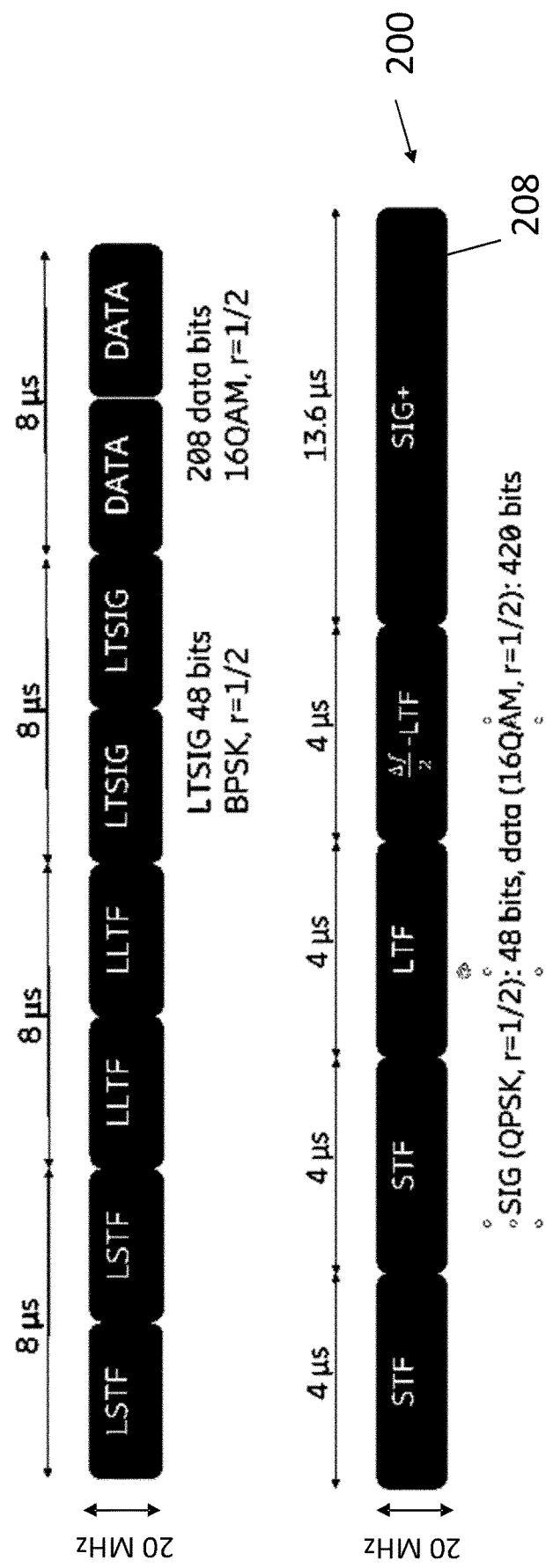
FIG. 9 illustrates a 20 KHz bandwidth LT PPDU compared to a 20 kHz bandwidth physical layer data unit.

FIG. 9 illustrates the 20 MHz bandwidth LT PPDU of FIG. 1 (top of FIG. 9) compared to the 20 MHz bandwidth physical layer data unit 200 (bottom of FIG. 9) according to embodiments of the present disclosure. The LT PPDU of FIG. 9 comprises two low throughput signal fields (LTSIG) comprising 48 signalling bits (i.e. protocol information) and two data packets comprising 208 data bits (i.e. payload data). The MCS used for the LTSIGs is BPSK with a data rate of ½ and the MCS used for the data packets is 16 QAM with a data rate of ½. The LT PPDU further comprises two LSTFs and two LLTFs to give a total duration of 32 μs.

The physical layer data unit 200 of FIG. 9 comprises the enhanced signal field 208 (SIG+) comprising 48 signalling bits (i.e. protocol information) and 420 data bits (i.e. further payload data). The MCS used for the signal portion of the enhanced signal field 208 is QPSK with a data rate of ½. The MCS to be used for the signal portion is indicated by the detection multiplier contained in the synchronisation information of the N training symbols 212, as discussed above. The MCS used for the data portion of the enhanced signal field 208 is 16QAM with a data rate of ½. The physical layer data unit 200 further comprises two STFs 214 to give a total duration of 29.6 μs. The number of signalling bits transmitted in the signal portion is 48 and the number of data bits transmitted in the data portion is 420. Therefore, using a 20 MHz bandwidth, the duration of the physical layer data unit 200 is reduced by 2.4 μs compared to the LT PPDU, but the physical layer data unit 200 transmits more than twice the amount of payload data compared to the LT PPDU (i.e. an additional 212 data bits, in the form of further payload data).

Figure 10:
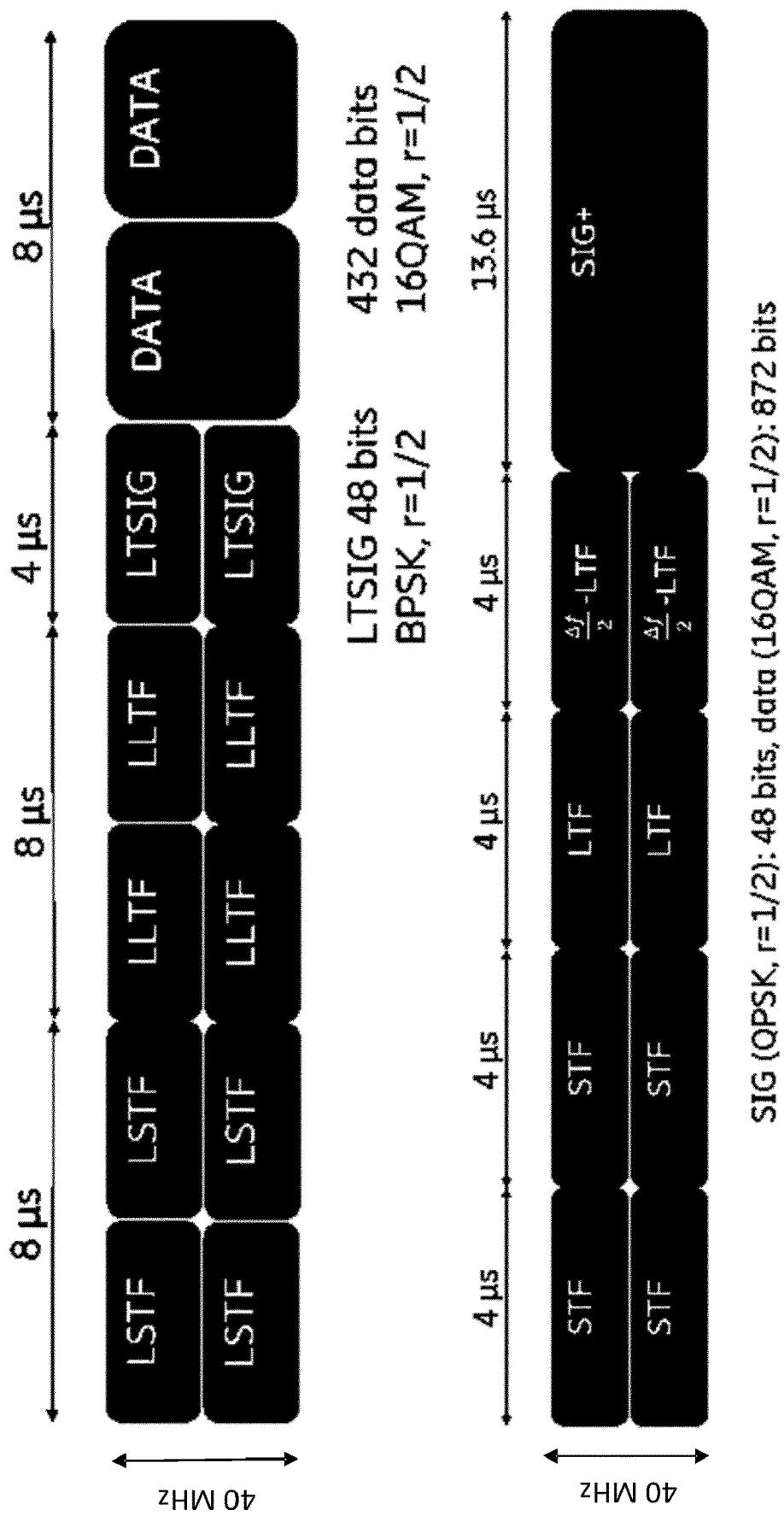
FIG. 10 illustrates a 40 kHz bandwidth LT PPDU compared to a 40 kHz bandwidth physical layer data unit.

FIG. 10 illustrates the 40 MHz bandwidth LT PPDU of FIG. 1 (top of FIG. 10) compared to the 40 MHz bandwidth physical layer data unit 200 (bottom of FIG. 10) according to embodiments of the present disclosure. The LT PPDU of FIG. 10 comprises two repeated low throughput signal fields (LTSIG) comprising 48 signalling bits (i.e. protocol information) and two data packets comprising 432 data bits (i.e. payload data). The MCS used for the LTSIGs is BPSK with a data rate of ½ and the MCS used for the data packets is 16 QAM with a data rate of ½. The LT PPDU further comprises two LSTFs and two LLTFs to give a total duration of 28 μs.

The physical layer data unit 200 of FIG. 10 comprises the enhanced signal field 208 (SIG+) comprising 48 signalling bits (i.e. protocol information) and 420 data bits (i.e. further payload data). The MCS used for the signal portion of the enhanced signal field 208 is QPSK with a data rate of ½. The MCS to be used for the signal portion is indicated by the detection multiplier contained in the repeated synchronisation information of the N training symbols 212, as discussed above. The MCS used for the data portion of the enhanced signal field 208 is 16QAM with a data rate of ½. The physical layer data unit 200 further comprises two repeated STFs 214 to give a total duration of 29.6 μs. The number of signalling bits transmitted in the signal portion is 48 and the number of data bits transmitted in the data portion is 872. Therefore, using a 40 MHz bandwidth, the duration of the physical layer data unit 200 is increased by 5.4% compared to the LT PPDU (i.e. an additional 1.6 μs), but the physical layer data unit 200 transmits more than twice the amount of payload data compared to the LT PPDU (i.e. an additional 440 data bits, in the form of further payload data).

The comparisons illustrated by FIGS. 9 and 10 demonstrate how overhead is reduced and transmission efficiency is improved by the physical layer data unit 200.

It will be understood that the detailed examples outlined above are merely examples. According to embodiments herein, the steps may be presented in a different order to that described herein. Furthermore, additional steps may be incorporated in the method that are not explicitly recited above. For the avoidance of doubt, the scope of protection is defined by the items.

This Disclosure May be Summarized by the Following Items:

1. A method of signalling in a Wireless Local Area Network, WLAN, the method comprising:
   transmitting, at a first wireless device of the WLAN, a signal comprising a physical layer data unit via a wireless channel of the WLAN using plural subcarriers spaced across plural symbols, the physical layer data unit comprising a data packet and a preamble, wherein the preamble comprises:
   a synchronisation part comprising a channel estimation part, wherein:
      the channel estimation part comprises N training symbols, where N is an integer greater than 1,
      the N training symbols comprise synchronisation information for synchronising a second wireless device with the first wireless device, the synchronisation information comprising an offset value, and
      synchronisation information transmitted in second and subsequent training symbols is transmitted using offset subcarriers, the offset subcarriers being frequency offset with respect to reference subcarriers used to transmit synchronisation information in a first training symbol, the frequency offset being equal to the offset value.

2. The method of signalling according to item 1, wherein:
   the offset value comprises a detection multiplier, the method further comprising:
   receiving, at the second wireless device of the WLAN, the signal comprising the physical layer data unit; and
   detecting, at the second wireless device of the WLAN, the physical layer data unit by determining if the detection multiplier is set to a detection value.

3. The method of signalling according to item 2, wherein the detecting comprises:
   selecting, at the second wireless device of the WLAN, a first received signal segment comprising the first training symbol and a second received signal segment comprising the second training symbol;
   adjusting, at the second wireless device of the WLAN, the frequency of the second received signal segment to negate the frequency offset;
   correlating, at the second wireless device of the WLAN, the first received signal segment with the adjusted second received signal segment; and
   determining, at the second wireless device of the WLAN, that the detection multiplier is set to the detection value if the first and second received signal segments correlate to a correlation detection value that is equal to or greater than a detection threshold.

4. The method of signalling according to item 3, wherein the frequency offset of the second received signal segment is negated by shifting in frequency the second received signal segment by an adjustment value, the adjustment value being equal to the negative of the offset value.

5. The method of signalling according to any of items 2 to 4, further comprising:
   estimating, at the second wireless device of the WLAN, the wireless channel used to transmit the physical layer data unit by correlating a reference wireless channel signal to a signal generated from segments of the received signal, wherein the signal generated from segments of the received signal comprises the first received signal segment comprising the first training symbol and the second received signal segment comprising the second training symbol.

6. The method of signalling according to item 5, wherein the method further comprises:
   outputting, at the second wireless device of the WLAN, a correlation estimate value of the correlated reference wireless channel signal and the signal generated from segments of the received signal as the channel estimate.

7. The method of signalling according to any of items 2 to 4, further comprising:
estimating, at the second wireless device of the WLAN, the wireless channel used to transmit the physical layer data unit by:
generating, at the second wireless device of the WLAN, an artificial signal comprising:
a first part comprising the first received signal segment comprising the first training symbol added to the second received signal segment comprising the second training symbol, and
a second part comprising the first received signal segment comprising the first training symbol subtracted from the second received signal segment comprising the second training symbol; and correlating the reference wireless channel signal to the artificial signal.

8. The method of signalling according to item 7, wherein the method comprises:
outputting, at the second wireless device of the WLAN, a correlation estimate value of the correlated reference wireless channel signal and the artificial signal as the channel estimate.

9. The method of signalling according to any preceding item, wherein the preamble further comprises:
an enhanced signal field comprising a signal portion and a data portion, the signal portion comprising decoding information for decoding payload data transmitted in the data packet, and the data portion comprising further payload data, wherein
the decoding information of the signal portion and the further payload data of the data portion are transmitted via the wireless channel in the same symbol.

10. The method of signalling according to item 9, wherein the method comprises:
multiplexing, at the first wireless device of the WLAN, the signal portion and the data portion together to generate the enhanced signal field.

11. The method of signalling according to item 9 or 10, wherein
the synchronisation information transmitted in the N training symbols is transmitted using a first subcarrier set, from among the plural subcarriers, the first subcarrier set being spaced across a first symbol set, from among the plural symbols, according to a primary subcarrier spacing, and
the decoding information and the further payload data transmitted in the enhanced signal field are transmitted using a second subcarrier set, from among the plural subcarriers, the second subcarrier set being spaced across the same symbol according to a secondary subcarrier spacing, the secondary subcarrier spacing being less than the primary subcarrier spacing.

12. The method of signalling according to any of items 9 to 11, wherein the payload data transmitted in the data packet is transmitted using a third subcarrier set, from among the plural subcarriers, the third subcarrier set being spaced across a second symbol set, from among the plural symbols, according to the secondary subcarrier spacing.

13. The method according to any of items 9 to 12, wherein:
the detection multiplier varies according to one of a plurality of predetermined patterns, wherein the method further comprises:
decoding, at the second wireless device of the WLAN, the decoding information of the signal portion according to a modulation scheme associated with the one of the plurality of predetermined patterns defined by the detection multiplier.

14. The method according to item 13, wherein:
a first modulation scheme is used when the detection multiplier is positive, and
a second modulation scheme is used when the detection multiplier is negative.

15. The method according to item 13, wherein:
a first modulation scheme is used when the detection multiplier varies between positive and negative values across the N training symbols according to a first predetermined pattern, and
a second modulation scheme is used when the detection multiplier varies between positive and negative values across the N training symbols according to a second predetermined pattern.

16. The method of signalling according to any of items 9 to 12, wherein:
the detection multiplier varies according to one of a plurality of predetermined patterns, wherein the method further comprises:
detecting, at the second wireless device of the WLAN, if a bandwidth of the enhanced data field is an upper bandwidth or a lower bandwidth.

17. The method of signalling according to item 16, wherein:
the second wireless device detects the upper bandwidth if the detection multiplier is a first value, and
the second wireless device detects the lower bandwidth if the detection multiplier is a second value.

18. The method according to any preceding item, wherein the synchronisation part further comprises a short training symbol comprising further synchronisation information.

19. The method according to any preceding item, wherein the WLAN uses Orthogonal Frequency Division Modulation, OFDM, the symbols are OFDM symbols and the subcarriers are OFDM subcarriers.

20. A first wireless device configured to perform signalling in a Wireless Local Area Network, WLAN, the first wireless device comprising processing circuitry and a non-transitory machine-readable medium storing instructions, wherein the first wireless device is configured to:
transmit a signal comprising a physical layer data unit via a wireless channel of the WLAN using plural subcarriers spaced across plural symbols, the physical layer data unit comprising a data packet and a preamble, wherein the preamble comprises:
a synchronisation part comprising a channel estimation part, wherein:
the channel estimation part comprises N training symbols, where N is an integer greater than 1,
the N training symbols comprise synchronisation information for synchronising a second wireless device with the first wireless device, the synchronisation information comprising an offset value, and:
synchronisation information transmitted in the second and subsequent training symbols is transmitted using offset subcarriers, the offset subcarriers being frequency offset with respect to reference subcarriers used to transmit synchronisation information in a first synchronisation symbol, the frequency offset being equal to an offset value.

21. A wireless system configured to perform signalling comprising a first wireless device according to item 20 and further comprising the second wireless device configured to perform signalling in a Wireless Local Area Network, WLAN, the wireless device comprising processing circuitry and a non-transitory machine-readable medium storing instructions, wherein the second wireless device is configured to:
receive the signal comprising the physical layer data unit, wherein the offset value comprises a detection multiplier; and
detect the physical layer data unit by determining if the detection multiplier is set to a detection value.

22. The wireless system configured to perform signalling according to item 21, wherein:
the offset value comprises a detection multiplier, and the processor of the second wireless device is further configured to:
receive the signal comprising the physical layer data unit, wherein the offset value comprises a detection multiplier; and
detect the physical layer data unit by determining if the detection multiplier is set to a detection value.

23. The wireless system configured to perform signalling according to item 22, wherein the processor of the second wireless device is further configured to:
select a first received signal segment comprising the first training symbol and a second received signal segment comprising the second training symbol;
adjust the frequency of the second received signal segment to negate the frequency offset;
correlate the first received signal segment with the adjusted second received signal segment; and
determine that the detection multiplier is set to the detection value if the first and second received signal segments correlate to a correlation detection value that is equal to or greater than a detection threshold.

24. The wireless system configured to perform signalling according to item 23, wherein the frequency offset of the second received signal segment is negated by shifting in frequency the second received signal segment by an adjustment value, the adjustment value being equal to the negative of the offset value.

25. The wireless system configured to perform signalling according to any of items 22 to 24, wherein the processor of the second wireless device is further configured to:
estimate the wireless channel used to transmit the physical layer data unit by correlating a reference wireless channel signal to a signal generated from segments of the received signal, wherein the signal generated from segments of the received signal comprises the first received signal segment comprising the first training symbol and the second received signal segment comprising the second training symbol.

26. The wireless system configured to perform signalling according to item 25, wherein the processor of the second wireless device is further configured to:
output a correlation estimate value of the correlated reference wireless channel signal and the signal generated from segments of the received signal as the channel estimate 27. The wireless system configured to perform signalling according to any of items 22 to 24, wherein the processor of the second wireless device is further configured to:
estimate the wireless channel used to transmit the physical layer data unit by:
generating an artificial signal comprising:
a first part comprising the first received signal segment comprising the first training symbol added to the second segment comprising the second training symbol, and
a second part comprising the first received signal segment comprising the first training symbol subtracted from the second received signal segment comprising the second training symbol; and
correlating the reference wireless channel signal to the artificial signal.

28. The wireless system configured to perform signalling according to item 27, wherein the processor of the second wireless device is further configured to:
output a correlation estimate value of the correlated reference wireless channel signal and the artificial signal as the channel estimate 29. The wireless system configured to perform signalling according to any of items 21 to 28, wherein the preamble further comprises:
an enhanced signal field comprising a signal portion and a data portion, the signal portion comprising decoding information for decoding payload data transmitted in the data packet, and the data portion comprising further payload data, wherein
the decoding information of the signal portion and the further payload data of the data portion are transmitted via the wireless channel in the same symbol.

30. The wireless system configured to perform signalling according to item 29, wherein the processor of the first wireless device is further configured to:
multiplex the signal portion and the data portion together to generate the enhanced signal field.

31. The wireless system configured to perform signalling according to items 29 or 30, wherein
the synchronisation information transmitted in the N training symbols is transmitted using a first subcarrier set, from among the plural subcarriers, the first subcarrier set being spaced across a first symbol set, from among the plural symbols, according to a primary subcarrier spacing, and
the decoding information and the further payload data transmitted in the enhanced signal field are transmitted using a second subcarrier set, from among the plural subcarriers, the second subcarrier set being spaced across the same symbol according to a secondary subcarrier spacing, the secondary subcarrier spacing being less than the primary subcarrier spacing.

32. The wireless system configured to perform signalling according to any of items 29 to 31, wherein the payload data transmitted in the data packet is transmitted using a third subcarrier set, from among the plural subcarriers, the third subcarrier set being spaced across a second symbol set, from among the plural symbols, according to the secondary subcarrier spacing.

33. The wireless system configured to perform signalling according to any of items 29 to 32, wherein:
the detection multiplier varies according to one of a plurality of predetermined patterns, and wherein the processor of the second wireless device is further configured to:
decode the decoding information of the signal portion according to a modulation scheme associated with the one of the plurality of predetermined patterns defined by the detection multiplier.

34. The wireless system configured to perform signalling according to item 33, wherein:
a first modulation scheme is used when the detection multiplier is positive, and
a second modulation scheme is used when the detection multiplier is negative.

35. The wireless system configured to perform signalling according to item 34, wherein:
a first modulation scheme is used when the detection multiplier varies between positive and negative values across the N training symbols according to a first predetermined pattern, and
a second modulation scheme is used when the detection multiplier varies between positive and negative values across the N training symbols according to a second predetermined pattern.

36. The wireless system configured to perform signalling according to any of items 29 to 32, wherein:
the detection multiplier varies according to one of a plurality of predetermined patterns, and wherein the processor of the second wireless device is further configured to:
detect if a bandwidth of the enhanced data field is an upper bandwidth or a lower bandwidth.

37. The wireless system configured to perform signalling according to item 36,
wherein:
the upper bandwidth is detected if the detection multiplier is a first value, and
the lower bandwidth is detected if the detection multiplier is negative second value.

38. The wireless system configured to perform signalling according to any of items 21 to 37, wherein the synchronisation part further comprises a short training symbol comprising further synchronisation information.

39. The wireless system configured to perform signalling according to any of items 21 to 38, wherein the WLAN uses Orthogonal Frequency Division Modulation, OFDM, the symbols are OFDM symbols and the subcarriers are OFDM subcarriers.

40. A first wireless device configured to perform signalling in a Wireless Local Area Network, WLAN, the first wireless device comprising:
a transmitter configured to transmit a signal comprising a physical layer data unit via a wireless channel of the WLAN using plural subcarriers spaced across plural symbols, the physical layer data unit comprising a data packet and a preamble, wherein the preamble comprises:
a synchronisation part comprising a channel estimation part, wherein:
the channel estimation part comprises N training symbols, where N is an integer greater than 1,
the N training symbols comprise synchronisation information for synchronising a second wireless device with the first wireless device, the synchronisation information comprising an offset value, and:
synchronisation information transmitted in the second and subsequent training symbols is transmitted using offset subcarriers, the offset subcarriers being frequency offset with respect to reference subcarriers used to transmit synchronisation information in a first synchronisation symbol, the frequency offset being equal to an offset value.

41. A wireless system configured to perform signalling comprising a first wireless device according to item 40 and further comprising a second wireless device comprising:
a receiver configured to receive the signal comprising the physical layer data unit, wherein the offset value comprises a detection multiplier; and
a detector configured to detect the physical layer data unit by determining if the detection multiplier is set to a detection value.

The invention claimed is:
1. A method of signalling in a Wireless Local Area Network, WLAN, the method comprising:
transmitting, at a first wireless device of the WLAN, a signal comprising a physical layer data unit via a wireless channel of the WLAN using plural subcarriers spaced across plural symbols, the physical layer data unit comprising a data packet and a preamble, the preamble comprising:
a synchronisation part comprising a channel estimation part:
the channel estimation part comprising N training symbols,
where N is an integer greater than 1,
the N training symbols comprising synchronisation information for synchronising a second wireless device with the first wireless device, the synchronisation information comprising an offset value, and
synchronisation information transmitted in second and subsequent training symbols is transmitted using offset subcarriers, the offset subcarriers being frequency offset with respect to reference subcarriers used to transmit synchronisation information in a first training symbol, the frequency offset being equal to the offset value.

2. The method of signalling according to claim 1, wherein the preamble further comprises:
an enhanced signal field comprising a signal portion and a data portion, the signal portion comprising decoding information for decoding payload data transmitted in the data packet, and the data portion comprising further payload data, and
wherein the decoding information of the signal portion and the further payload data of the data portion are transmitted via the wireless channel in the same symbol.

3. The method of signalling according to claim 2, wherein the method comprises:
multiplexing, at the first wireless device of the WLAN, the signal portion and the data portion together to generate the enhanced signal field.

4. The method of signalling according to claim 3, wherein the synchronisation information transmitted in the N training symbols is transmitted using a first subcarrier set, from among the plural subcarriers, the first subcarrier set being spaced across a first symbol set, from among the plural symbols, according to a primary subcarrier spacing, and
the decoding information and the further payload data transmitted in the enhanced signal field are transmitted using a second subcarrier set, from among the plural subcarriers, the second subcarrier set being spaced across the same symbol according to a secondary subcarrier spacing, the secondary subcarrier spacing being less than the primary subcarrier spacing.

5. The method according to claim 3, wherein the synchronisation part further comprises a short training symbol comprising further synchronisation information.

6. The method according to claim 3, wherein the WLAN uses Orthogonal Frequency Division Modulation, OFDM, the symbols are OFDM symbols and the subcarriers are OFDM subcarriers.

7. The method of signalling according to claim 2, wherein the synchronisation information transmitted in the N training symbols is transmitted using a first subcarrier set, from among the plural subcarriers, the first subcarrier set being spaced across a first symbol set, from among the plural symbols, according to a primary subcarrier spacing, and the decoding information and the further payload data transmitted in the enhanced signal field are transmitted using a second subcarrier set, from among the plural subcarriers, the second subcarrier set being spaced across the same symbol according to a secondary subcarrier spacing, the secondary subcarrier spacing being less than the primary subcarrier spacing.

8. The method according to claim 2, wherein the synchronisation part further comprises a short training symbol comprising further synchronisation information.

9. The method according to claim 2, wherein the WLAN uses Orthogonal Frequency Division Modulation, OFDM, the symbols are OFDM symbols and the subcarriers are OFDM subcarriers.

10. The method according to claim 1, wherein the synchronisation part further comprises a short training symbol comprising further synchronisation information.

11. The method according to claim 1, wherein the WLAN uses Orthogonal Frequency Division Modulation, OFDM, the symbols are OFDM symbols and the subcarriers are OFDM subcarriers.

12. A first wireless device configured to perform signalling in a Wireless Local Area Network, WLAN, the first wireless device comprising:
  a transmitter configured to transmit a signal comprising a physical layer data unit via a wireless channel of the WLAN using plural subcarriers spaced across plural symbols, the physical layer data unit comprising a data packet and a preamble, the preamble comprising:
    a synchronisation part comprising a channel estimation part:
      the channel estimation part comprising N training symbols,
      where N is an integer greater than 1,
        the N training symbols comprising synchronisation information for synchronising a second wireless device with the first wireless device, the synchronisation information comprising an offset value, and
        synchronisation information transmitted in the second and subsequent training symbols is transmitted using offset subcarriers, the offset subcarriers being frequency offset with respect to reference subcarriers used to transmit synchronisation information in a first synchronisation symbol, the frequency offset being equal to an offset value.

13. The first wireless device according to claim 12, wherein the preamble further comprises:
  an enhanced signal field comprising a signal portion and a data portion, the signal portion comprising decoding information for decoding payload data transmitted in the data packet, and the data portion comprising further payload data, and
  wherein the decoding information of the signal portion and the further payload data of the data portion are transmitted via the wireless channel in the same symbol.

14. The first wireless device according to claim 13, wherein the first wireless device is configured to:
  multiplex the signal portion and the data portion together to generate the enhanced signal field.

15. The first wireless device according to claim 13, wherein the synchronisation information transmitted in the N training symbols is transmitted using a first subcarrier set, from among the plural subcarriers, the first subcarrier set being spaced across a first symbol set, from among the plural symbols, according to a primary subcarrier spacing, and
  the decoding information and the further payload data transmitted in the enhanced signal field are transmitted using a second subcarrier set, from among the plural subcarriers, the second subcarrier set being spaced across the same symbol according to a secondary subcarrier spacing, the secondary subcarrier spacing being less than the primary subcarrier spacing.

16. The first wireless device according to claim 12, wherein the synchronisation part further comprises a short training symbol comprising further synchronisation information.

17. The first wireless device according to claim 12, wherein the WLAN uses Orthogonal Frequency Division Modulation, OFDM, the symbols are OFDM symbols and the subcarriers are OFDM subcarriers.

* * * * *